（12） United States Patent
Tanaka et al.

(10) Patent No.: US 8,891,019 B2
(45) Date of Patent: Nov. 18, 2014

(54) IMAGE PROCESSING APPARATUS, IMAGE PROCESSING METHOD, AND PROGRAM

(75) Inventors: Kenji Tanaka, Kanagawa (JP); Kunio Kawaguchi, Kanagawa (JP); Yoshihiro Takahashi, Kanagawa (JP); Kazumasa Tanaka, Kanagawa (JP); Daisuke Kikuchi, Kanagawa (JP); Naohide Yamada, Kanagawa (JP); Hiroyuki Morisaki, Kanagawa (JP)

(73) Assignee: Sony Corporation, Tokyo (JP)

(*) Notice: Subject to any disclaimer, the term of this patent is extended or adjusted under 35 U.S.C. 154(b) by 867 days.

(21) Appl. No.: 13/077,415

(22) Filed: Mar. 31, 2011

(65) Prior Publication Data

US 2011/0249189 A1    Oct. 13, 2011

(30) Foreign Application Priority Data

Apr. 9, 2010   (JP) ................................ P2010-090608

(51) Int. Cl.
*H04N 5/14*      (2006.01)
*H04N 7/12*      (2006.01)
*G06F 17/30*     (2006.01)

(52) U.S. Cl.
CPC .... *G06F 17/30271* (2013.01); *G06F 17/30017* (2013.01); *G06F 17/30781* (2013.01)
USPC ...................... 348/700; 375/240.16

(58) Field of Classification Search
CPC .............. H04N 5/147; G06F 17/30017; G06F 17/30271; G06F 17/30781

USPC .................. 375/240, 240.01, 240.08, 240.12, 375/240.16; 386/96; 348/700
See application file for complete search history.

(56) References Cited

U.S. PATENT DOCUMENTS

| 5,956,026 | A | 9/1999 | Ratakonda |
| 2004/0264568 | A1* | 12/2004 | Florencio ................. 375/240.12 |
| 2006/0083302 | A1* | 4/2006 | Han et al. ................. 375/240.08 |
| 2009/0007202 | A1 | 1/2009 | Williams et al. |
| 2009/0034937 | A1* | 2/2009 | Kusunoki et al. ............... 386/96 |

FOREIGN PATENT DOCUMENTS

| EP | 1 109 111 | 6/2001 |
| JP | 2001 134589 | 5/2001 |

OTHER PUBLICATIONS

Taskiran C et al: "A compressed video database structured for active browsing and search": Image Processing, 1998. ICIP 98. Proceedings. 1998 International Conference on Chicago, IL, USA Oct. 4-7, 1998, Los Alamitos, CA, USA,IEEE Comput. Soc, US, vol. 3, Oct. 4, 1998, pp. 133-137, XP010586871, DOI: DOI:10.1109/ICIP.1998. 999004 ISBN: 978-0-8186-8821-8.

* cited by examiner

*Primary Examiner* — Allen Wong
(74) *Attorney, Agent, or Firm* — Frommer Lawrence & Haug LLP; William S. Frommer; Ellen Marcie Emas

(57) ABSTRACT

An image processing apparatus includes: a first layer summary data generation section; a second layer summary data generation section; a first search section; and a second search section.

7 Claims, 15 Drawing Sheets

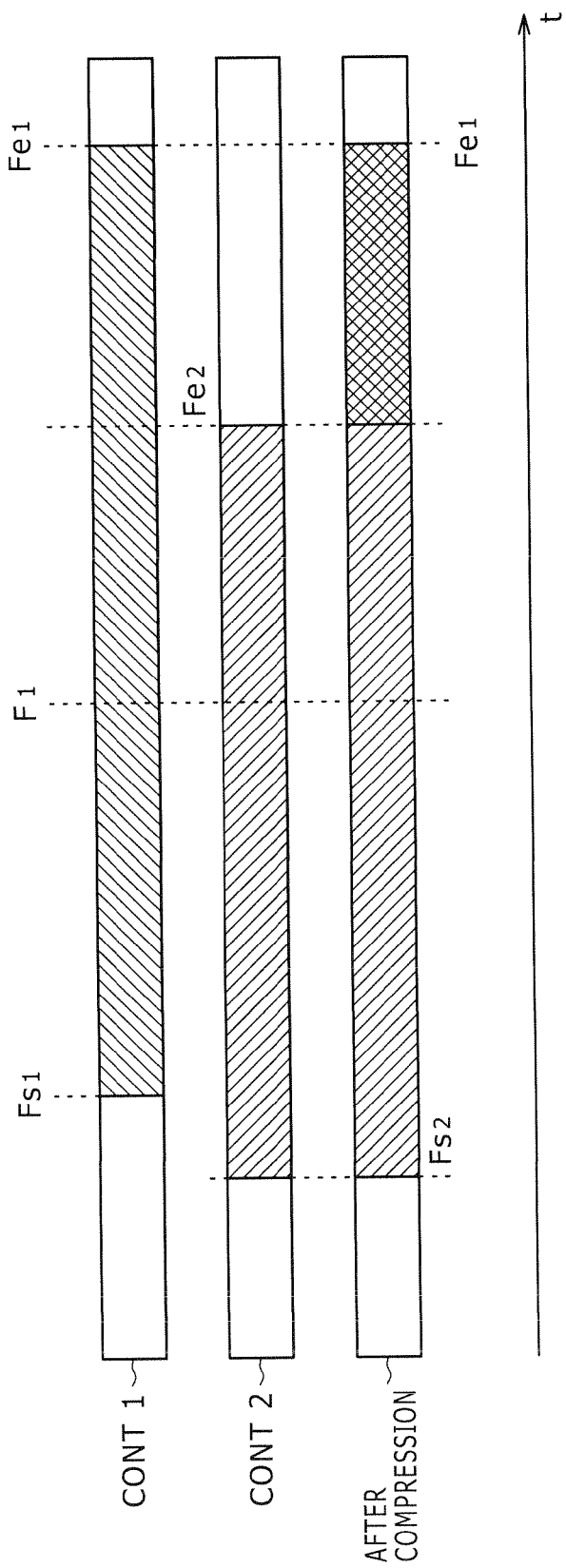

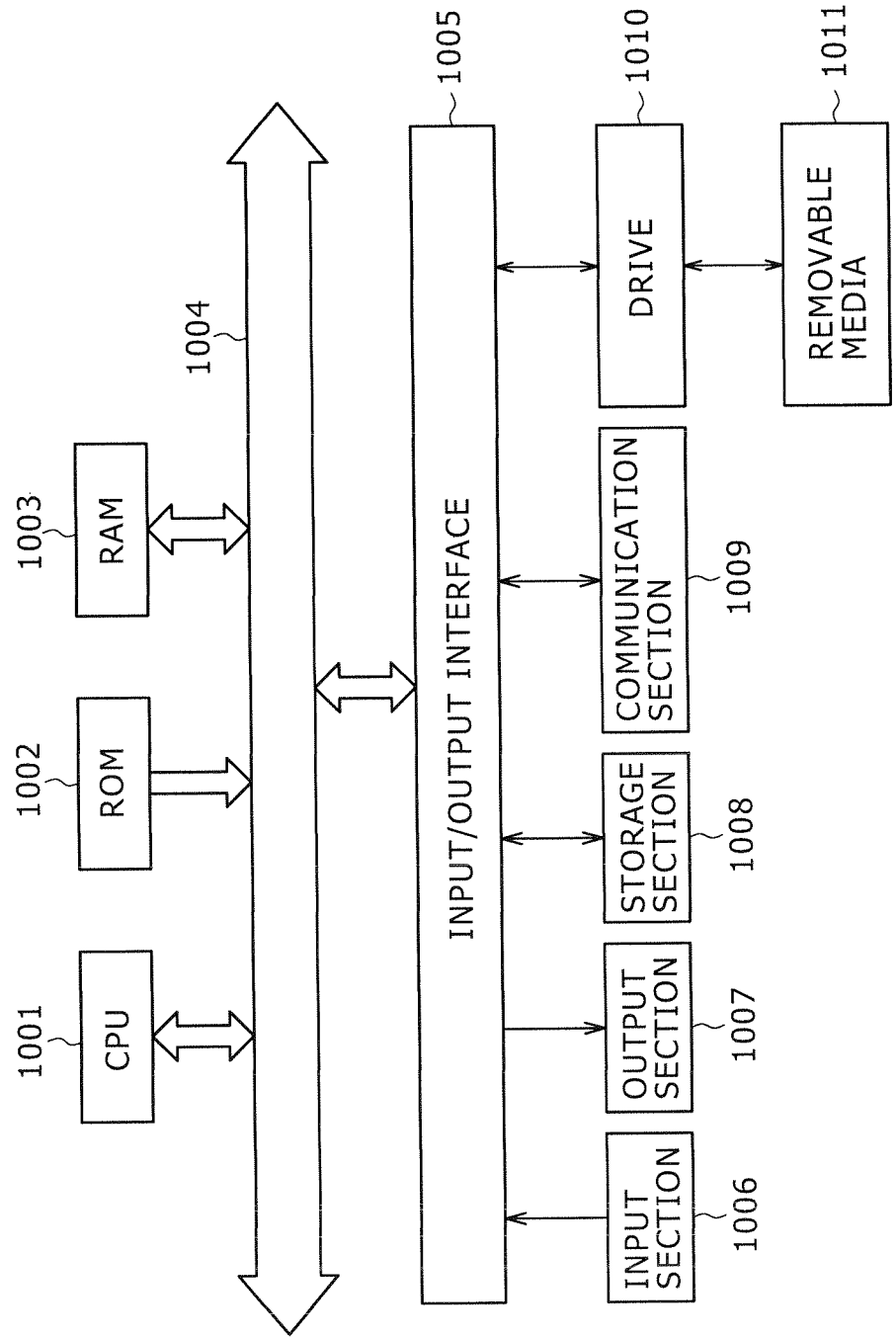

IMAGE PROCESSING APPARATUS, IMAGE PROCESSING METHOD, AND PROGRAM

BACKGROUND OF THE INVENTION

1. Field of the Invention

The present invention relates to an image processing apparatus, an image processing method, and a program. More particularly, the invention relates to an image processing apparatus, an image processing method, and a program for easily searching and managing numerous moving image contents.

2. Description of the Related Art

The technology for managing a large number of moving image contents has been gaining widespread acceptance.

Huge amounts of moving image contents continue to be broadcasted and recorded every day by broadcasting stations in particular. The ever-growing quantities of moving image contents accumulate uninterruptedly. It is thus extremely difficult to search the numerous moving image contents for specific contents.

One technique for bypassing the problems above (see Japanese Patent Laid-Open No. 2001-134589 (hereinafter referred to as Patent Document 1)) involves making comparisons between the metadata of some of the representative images included in the moving image contents targeted for search on the one hand, and the metadata of the moving image contents already registered and accumulated on the other hand, in order to search for and retrieve similar moving image contents.

SUMMARY OF THE INVENTION

Where there exist overlapping moving image contents including images made of the same metadata, the technique disclosed by the Patent Document 1 demands searching through the result of search by use of another representative moving image. Also, given the huge quantities of moving image contents including numerous similar images, unless a singularly characteristic representative moving image content is used for search, it is increasingly difficult to isolate the desired moving image content out of the target moving image contents targeted for search, as the amount of the moving image contents being managed grows ever larger. As a result, searching for a desired moving image content may demand expending more and more time and effort than ever before.

The present embodiment has been made in view of the above circumstances and provides inventive arrangements for easily managing huge amounts of moving image contents and for easily searching the large quantities of moving image contents being managed for a target moving image content to be retrieved.

In carrying out the present invention and according to one embodiment thereof, there is provided an image processing apparatus including: a first layer summary data generation section configured such that out of images extracted with a first frequency from the images making up a moving image content, the first layer summary data generation section generates first layer summary data of a first size before registering the first layer summary data to a database; a second layer summary data generation section configured such that out of images extracted with a second frequency higher than the first frequency from the images making up the moving image content, the second layer summary data generation section generates second layer summary data of a second size smaller than the first size; a first search section configured such that based on the first layer summary data generated by the first layer summary data generation section, the first search section searches the database for a corresponding moving image content; and a second search section configured such that based on the second layer summary data generated by the second layer summary data generation section, the second search section searches the moving image contents retrieved by the first search section for a corresponding moving image content.

Preferably, the first layer summary data may be made up of one or a combination of a pixel value, a brightness value, an activity, an audio volume, and an average of amplitudes within a predetermined audio frequency band regarding each of a plurality of partitioned regions constituting each of the images which are part of the moving image contents and which are extracted therefrom with the first frequency, the first layer summary data having the first size; and the second layer summary data may be made up of at least one or a combination of a pixel value, a brightness value, an activity, an audio volume, and an average of amplitudes within a predetermined audio frequency band regarding each of a plurality of partitioned regions constituting each of the images which are part of the moving image contents and which are extracted therefrom with the second frequency higher than the first frequency, the second layer summary data having the second size.

Preferably, the first and the second frequencies may be those with which the images are extracted from the moving image contents either periodically or nonperiodically.

Preferably, the periodical image extraction may mean extracting the images at intervals of a predetermined number of frames; and the nonperiodical image extraction may mean extracting the images every time a scene change occurs in the moving image content or every time a silent part of audio data is followed by a nonsilent part thereof.

Preferably, the image processing apparatus of the present embodiment may further include a compression unit configured to connect different regions between the moving image content retrieved by the second search section on the one hand and the moving image content from which the first layer summary data is generated by the first layer summary data generation section on the other hand, so as to delete either of the contents for moving image content data compression.

According to another embodiment of the present invention, there is provided an image processing method for use with an image processing apparatus including a first layer summary data generation section configured such that out of images extracted with a first frequency from the images making up a moving image content, the first layer summary data generation section generates first layer summary data of a first size before registering the first layer summary data to a database; a second layer summary data generation section configured such that out of images extracted with a second frequency higher than the first frequency from the images making up the moving image content, the second layer summary data generation section generates second layer summary data of a second size smaller than the first size; a first search section configured such that based on the first layer summary data generated by the first layer summary data generation section, the first search section searches the database for a corresponding moving image content; and a second search section configured such that based on the second layer summary data generated by the second layer summary data generation section, the second search section searches the moving image contents retrieved by the first search section for a corresponding moving image content. The image processing method including the steps of: causing the first layer summary data generation section to generate, out of the images extracted with the first frequency from the images making up the moving image content, the first layer summary data of the first size before registering the first layer summary data to the database; causing the second layer summary data generation section to generate, out of the images extracted with the second frequency higher than the first frequency from the images making up the moving image content, the second layer summary data of the second size smaller than the first size; causing the first search section to search the database for the corresponding moving image content based on the first layer summary data generated by the first layer summary data generation step; and causing the second search section to search the moving image contents retrieved by the first search step for the corresponding moving image content based on the second layer summary data generated by the second layer summary data generation step.

According to a further embodiment of the present invention, there is provided a program for use with a computer controlling an image processing apparatus including a first layer summary data generation section configured such that out of images extracted with a first frequency from the images making up a moving image content, the first layer summary data generation section generates first layer summary data of a first size before registering the first layer summary data to a database; a second layer summary data generation section configured such that out of images extracted with a second frequency higher than the first frequency from the images making up the moving image content, the second layer summary data generation section generates second layer summary data of a second size smaller than the first size; a first search section configured such that based on the first layer summary data generated by the first layer summary data generation section, the first search section searches the database for a corresponding moving image content; and a second search section configured such that based on the second layer summary data generated by the second layer summary data generation section, the second search section searches the moving image contents retrieved by the first search section for a corresponding moving image content. The program causing the computer to execute a procedure including the steps of: causing the first layer summary data generation section to generate, out of the images extracted with the first frequency from the images making up the moving image content, the first layer summary data of the first size before registering the first layer summary data to the database; causing the second layer summary data generation section to generate, out of the images extracted with the second frequency higher than the first frequency from the images making up the moving image content, the second layer summary data of the second size smaller than the first size; causing the first search section to search the database for the corresponding moving image content based on the first layer summary data generated by the first layer summary data generation step; and causing the second search section to search the moving image contents retrieved by the first search step for the corresponding moving image content based on the second layer summary data generated by the second layer summary data generation step.

According to the present invention embodied as outlined above, out of images extracted with a first frequency from the images making up a moving image content, first layer summary data of a first size is generated before being registered to a database. Out of images extracted with a second frequency higher than the first frequency from the images making up the moving image content, second layer summary data of a second size smaller than the first size is generated. The database is searched for a corresponding moving image content based on the first layer summary data. And the retrieved moving image contents are searched for a corresponding moving image content based on the second layer summary data.

The image processing apparatus of the present embodiments may be an independent apparatus or a block that performs image processing.

According to embodiments of the present invention, it is possible easily to search and manage a large number of moving image contents.

BRIEF DESCRIPTION OF THE DRAWINGS

FIG. 14 is a schematic view explanatory of the compression process; and

FIG. 15 is a schematic view explanatory of a typical structure of a general-purpose personal computer.

DETAILED DESCRIPTION OF THE PREFERRED EMBODIMENTS

[Typical Structure of the Image Processing Apparatus]

Figure 1:
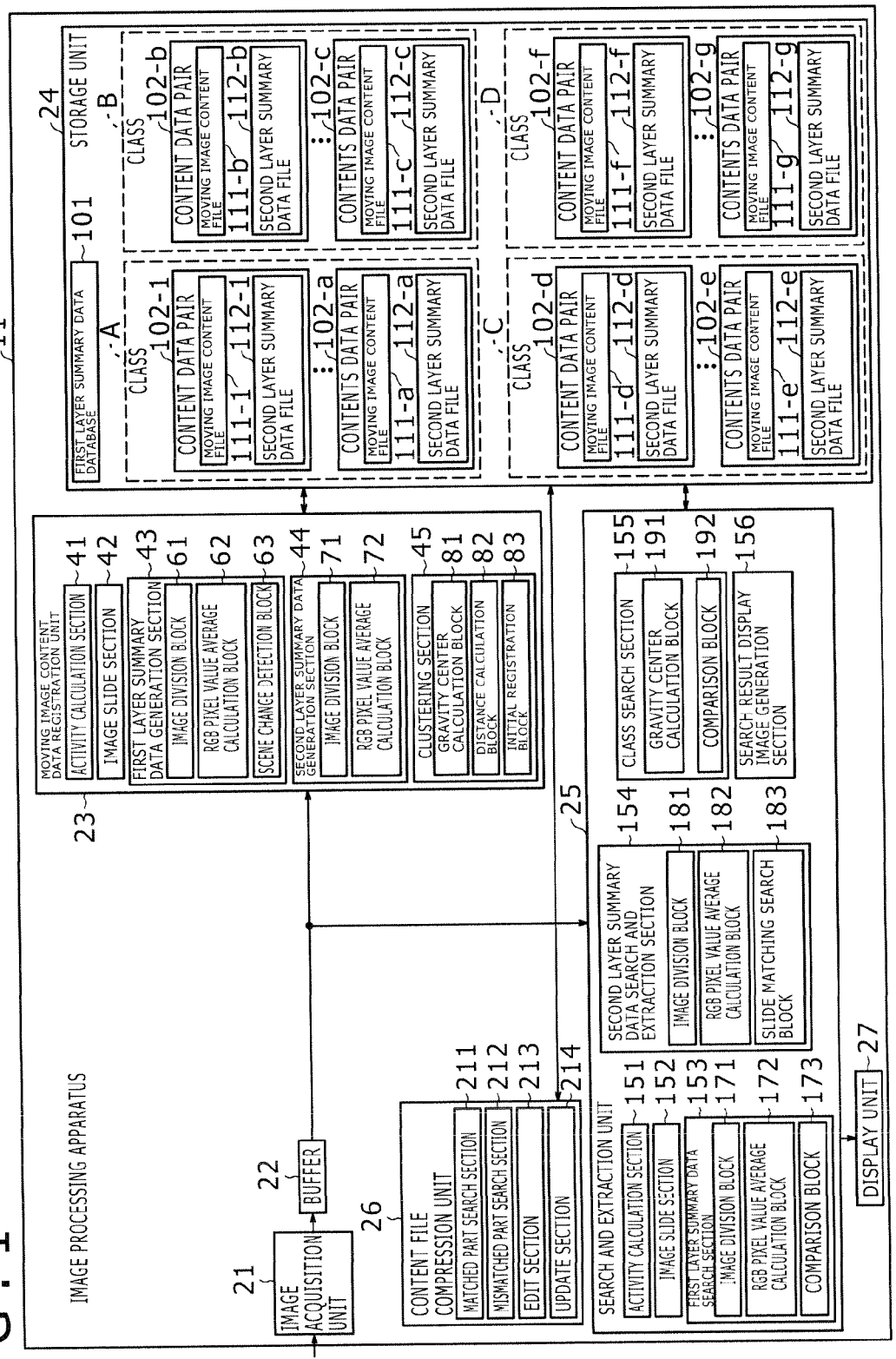
FIG. 1 is a block diagram showing a typical structure of an image processing apparatus as an embodiment of the present invention.

FIG. 1 shows a typical structure of an image processing apparatus 11 as an embodiment of the present invention. The image processing apparatus 11 in FIG. 1 stores moving image contents and allows the stored contents to be searched for and extracted as needed.

The image processing apparatus 11 includes an image acquisition unit 21, a buffer 22, a moving image content data registration unit 23, a storage unit 24, a search and extraction unit 25, a content file compression unit 26, and a display unit 27.

The image acquisition unit 21 acquires moving image contents to be registered or sample data as part of the moving image contents targeted for search, and temporarily stores what is acquired into the buffer 22. The sample data may typically include portions of moving image contents that can be downloaded over the Internet, images related to the contents, and sample moving images.

From the moving image content stored in the buffer 22 preparatory to registration, the moving image content data registration unit 23 generates first layer summary data and second layer summary data. The moving image content data registration unit 23 registers the first layer summary data to a first layer summary data database (DB) 101 of the storage unit 24. Also, the moving image content data registration unit 23 stores a second layer summary data file 112 made of the second layer summary data paired with a moving image content file 111 composed of the moving image content, into the storage unit 24 as a content data pair 102. In this case, if the moving image contents held in the storage unit 24 are clustered (i.e., grouped into classes), the moving image content data registration unit 23 classifies a given moving image content into one of the classes based on the first layer summary data, before storing the moving image content in question.

The storage unit 24 in FIG. 1 includes the first layer summary data database 101 and a plurality of classes A through D. The classes A through D include content data pairs 102-1 through 102-a, 102-b through 102-c, 102-d through 102-e, and 102-f through 102-g, respectively. The content data pairs 102-1 through 102-a include moving image content files 111-1 through 111-a and second layer summary data files 112-1 through 112-a, respectively. The content data pairs 102-b through 102-c include moving image content files 111-b through 111-c and second layer summary data files 112-b through 112-c, respectively. The content data pairs 102-d through 102-e include moving image content files 111-d through 111-e and second layer summary data files 112-d through 112-e, respectively. The content data pairs 102-f through 102-g include moving image content files 111-f through 111-g and second layer summary data files 112-f through 112-g, respectively.

Where there is no particular need to distinguish between these files, the content data pairs may simply be referred to as the content data pair 102, the moving image content files as the moving image content file 111, and the second layer summary data files as the second layer summary data file 112. The same also applies to the other components and related elements of the image processing apparatus 11. The classes A through D are structured in such a manner that information is simply recorded to each class corresponding to the first layer summary data which is managed by the first layer summary data database 101 and which belongs to the class in question. There are no individual folders or the like named classes A through D in the storage unit 24 for management purposes. The storage unit 24 is shown in FIG. 1 in a manner merely revealing its class structure schematically. In practice, the content data pairs 102 are not recorded individually to regions arranged uniformly by class. Also, although the moving image content file 111 and the second layer summary data file 112 making up the content data pair 102 are recorded as related to each other, these files are separately provided files that can be managed individually.

The moving image content data registration unit 23 includes an activity calculation section 41, an image slide section 42, a first layer summary data generation section 43, a second layer summary data generation section 44, and a clustering section 45. The activity calculation section 41 obtains as an activity image the image with its pixel value represented by the difference in pixel value between adjacent pixels of an image included in a given moving image content. The image slide section 42 slides the position of the highest activity to the center of the image based on the activity image calculated by the activity calculation section 41. That is, since the position of the highest activity in the image visually attracts the human's attention the most, that position is moved into the center of the image so as to normalize the first and the second layer summary data to be extracted.

The first layer summary data generation section 43 includes an image division block 61, an RGB pixel value average calculation block 62, and a scene change detection block 63. The first layer summary data generation section 43 generates first layer summary data from a frame of interest which occurs at predetermined intervals in the input moving image content or which occurs at the time of a scene change detected by the scene change detection block 63. That is, the first layer summary data generation section 43 controls the image division block 61 to divide the frame of interest into a predetermined number of partitioned regions. The first layer summary data generation section 43 also controls the RGB pixel value average calculation block 62 to calculate averages of the pixel values regarding each of the RGB pixels (red, green and blue pixels) in each of the partitioned regions. The first layer summary data generation section 43 then obtains as first layer summary data a frame-based vector which is formed by the elements composed of the calculated pixel value averages regarding each of the RGB pixels in each of the partitioned regions and which is about 100 bytes in amount, and registers the acquired first layer summary data to the first layer summary data database 101.

The second layer summary data generation section 44 includes an image division block 71 and an RGB pixel value average calculation block 72, and generates second layer summary data from all frames constituting a given moving image content. The image division block 71 and RGB pixel value average calculation block 72 are the same as the image division block 61 and RGB pixel value average calculation block 62 of the first layer summary data generation section 43, respectively.

That is, the second layer summary data generation section 44 controls the image division block 71 to divide the frame of interest into a predetermined number of partitioned regions. The second layer summary data generation section 44 also controls the RGB pixel value average calculation block 72 to calculate averages of the pixel values regarding each of the RGB pixels (red, green and blue pixels) in each of the partitioned regions. The second layer summary data generation section 44 then obtains as second layer summary data a frame-based vector which is formed by the elements composed of the calculated averages of the RGB pixels in each of the partitioned regions and which is about 30 bytes in amount. Furthermore, the second layer summary data generation section 44 stores into the storage unit 24 a content data pair 102 constituted by a second layer summary data file 112 in which the second layer summary data thus obtained are arrayed chronologically and by the moving image content file 111.

The first layer summary data and the second layer summary data each include information indicating which moving image content file the data in question belongs to. Although the first layer summary data is set to be about 100 bytes in amount obtained at intervals of 30 frames and the second layer summary data is set to be about 30 bytes in amount obtained per frame, the first layer summary data may be acquired at intervals of a different number of frames and may be formed by a different amount of information as long as the first layer summary data has a lower frequency of frames and is formed by a larger quantity than the second layer summary data. That is, the first layer summary data may be data of a relatively large quantity because it is individually searched for and retrieved from the first layer summary data database 101. On the other hand, the second layer summary data individually needs to have a small data size because it is used in units of the second layer summary data file 112 containing a plurality of second layer summary data that are managed chronologically.

The clustering section 45 includes a gravity center calculation block 81, a distance calculation block 82, and an initial registration block 83. Based on the first layer summary data registered in the first layer summary data database 101, the clustering section 45 classifies (i.e., clusters) those of a plurality of content data pairs 102 which are similar to one another and which are stored in the storage unit 24 into the same class.

When a new moving image content file 111 is to be registered to the storage unit 24 whose clustering has been complete, the clustering section 45 classifies the new file based on the first layer summary data of the moving image content to be registered anew. That is, the clustering section 45 first controls the gravity center calculation block 81 to calculate the gravity center vectors of the first layer summary data made of the vectors belonging to various classes. The clustering section 45 then controls the distance calculation block 82 to calculate the distance between the gravity center of each of the classes involved on the one hand, and the vector constituting the first layer summary data of the moving image content to be registered anew on the other hand. The clustering section 45 classifies the moving image content to be newly registered into the class having the gravity center at the shortest distance to the vector made of the first layer summary data of the moving image content to be added anew.

If the content data pairs 102 registered in the storage unit 24 have yet to be classified, the clustering section 45 clusters these content data pairs 102 into classes. That is, the clustering section 45 controls the distance calculation block 82 to calculate the distances between the vectors making up the first layer summary data which represent the moving image contents and which are registered in the first layer summary data database 101, in order to cluster the moving image content data found within a predetermined range of distances into the same class. The clustering section 45 also controls the initial registration block 83 to register the classes of the first layer summary data into which the moving image contents have been clustered.

The search and extraction unit 25 includes an activity calculation section 151, an image slide section 152, a first layer summary data search section 153, a second layer summary data search and extraction section 154, a class search section 155, and a search result display image generation section 156. The search and extraction unit 25 searches the moving image contents based on the sample data related to the moving image content which was acquired by the image acquisition unit 21 and placed into the buffer 22 and which is targeted for search. The search and extraction unit 25 displays the result of the search on the display unit 27.

More specifically, the activity calculation section 151 and image slide section 152 are the same as the activity calculation section 41 and image slide section 42 of the moving image content data registration unit 23, respectively. That is, the activity calculation section 151 calculates the activities formed by the difference values between the adjacent pixels in images (i.e., frames) related to the moving image content targeted for search, so as to generate an activity image composed of the calculated activities as its pixel values. The image slide section 152 slides the position of the largest activity into the center of the activity image thus calculated.

The first layer summary data search section 153 includes an image division block 171, an RGB pixel value average calculation block 172 and a comparison block 173. The first layer summary data search section 153 generates first layer summary data from a representative image of the sample data related to the moving image content targeted for search. That is, the first layer summary data search section 153 first controls the image division block 171 to divide the representative image into a plurality of partitioned regions. The first layer summary data search section 153 then controls the RGB pixel value average calculation block 172 to obtain averages of the pixels regarding each of the RGB pixels (red, green and blue pixels) in each of the partitioned regions. The first layer summary data search section 153 then obtains as first layer summary data a frame-based vector which is formed by the elements composed of the calculated pixel value averages regarding each of the RGB pixels in each of the partitioned regions and which is about 100 bytes in amount. Incidentally, the representative image of given sample data is either the first image of the moving image content making up the sample data, or the image occurring at the time of each scene change.

The first layer summary data search section 153 controls the comparison block 173 to make comparisons between the vectors constituting first layer summary data of the representative image obtained from the sample data on the one hand, and the vectors constituting the first layer summary data registered in the first layer summary data database 101 on the other hand, so as to determine whether there is a match or a similarity therebetween. Also, the first layer summary data search section 153 searches candidates of the moving image content to be searched for corresponding to the first layer summary data of the sample data. In this case, it is assumed that the class search section 155 has obtained beforehand the gravity center vector of a matched class following the comparisons to determine whether there is a match or a similarity between the vector of the first layer summary data of the representative image on the one hand, and the gravity center vectors of the first layer summary data clustered into various classes on the other hand. On that assumption, the first layer summary data search section 153 searches for the moving image content corresponding to the first layer summary data of the sample data based on the result of the comparisons indicating either a match with or a similarity to the first layer summary data belonging to the target class. That is, each class is made up of the first layer summary data of which the distances between the vectors constituting the data are short. For this reason, from among the first layer summary data registered in the first layer summary data database 101, the first layer summary data search section 153 need only put to comparison the first layer summary data belonging to the class that has the gravity center vector matching the first layer summary data of the representative image. This feature enhances the speed of search.

The second layer summary data search and extraction section 154 generates second search summary data based on the moving image information regarding the moving image content of the sample data targeted for search. The second layer summary data search and extraction section 154 proceeds to search for a match between the second search summary data of the sample data on the one hand, and the second layer summary data file 112 of the moving image contents of the first layer summary data retrieved by the first layer summary data search section 153 on the other hand. That is, the second layer summary data search and extraction section 154 controls the image division block 181 to divide into a predetermined number of partitioned regions each of the frames constituting the moving image information about the moving image content of the sample data targeted for search. The second layer summary data search and extraction section 154 then controls an RGB pixel value average calculation block 182 to calculate averages of the pixel values regarding each of the RGB pixels (red, green and blue pixels) in each of the partitioned regions. The second layer summary data search and extraction section 154 then obtains as second layer summary data of the sample data a frame-based vector which is formed by the elements composed of the calculated pixel value averages regarding each of the RGB pixels in each of the partitioned regions and which is about 30 bytes in amount. That is, the second layer summary data file 112 is a file in which the second layer summary data obtained per frame are arrayed chronologically. Thus if the second layer summary data of the sample data registered and arrayed chronologically in the second layer summary data file 112 are slid frame by frame so as to obtain sequentially the difference between the second layer summary data of the corresponding frames, and if the smallest of the difference values is found smaller than a predetermined threshold value, then it is determined that a match with or a similarity to the moving image content targeted for search has occurred. In the event of a match with or a similarity to the moving image content targeted for search, the slide position at which the difference value is the smallest is determined as the reproduction position for the sample data in question within the moving image content targeted for search.

The class search section 155 obtains the distance between the vector making up the first layer summary data acquired from the representative image of the sample data on the one hand, and the gravity center vector of each of the classes registered in the first layer summary data database 101 stored in the storage unit 24 on the other hand, in order to search for a class that is within a predetermined distance. That is, the class search section 155 controls the gravity center calculation block 191 to obtain the gravity center vector of the vectors constituting the first layer summary data belonging to each of the classes. The class search section 155 then searches the class having the gravity center vector within the predetermined distance to find the distance between the vector formed by the first layer summary data of the representative image and the gravity center vector.

The search result display image generation section 156 causes the display unit 27 such as an LCD (liquid crystal display) to display an image corresponding to the first layer summary data of the moving image content searched for by the second layer summary data search and extraction section 154.

The content file compression unit 26 includes a matched part search section 211, a mismatched part search section 212, an edit section 213, and an update section 214. The content file compression unit 26 searches for matched and mismatched parts in the second layer summary data file 112 retrieved by the second layer summary data search and extraction section 154, and performs edits such as deleting of the matched parts leaving only one of them and splicing it to the remaining mismatched parts so as to compress the data amount in the moving image content file 111. That is, the content file compression unit 26 controls the matched part detection section 211 to search for a range of matched parts in the retrieved second layer summary data file 112. The content file compression unit 26 also controls the mismatched part search section 212 to search for a range of mismatched parts of the retrieved file. The content file compression unit 26 then controls the edit section 213 to perform edits involving the deleting of the matched parts leaving only one of them and connecting it to the mismatched parts as needed. Using the moving image content file 111 thus generated anew, the content file compression unit 26 updates the current moving image content file 111.

[Moving Image Content Storage Process]

Figure 2:
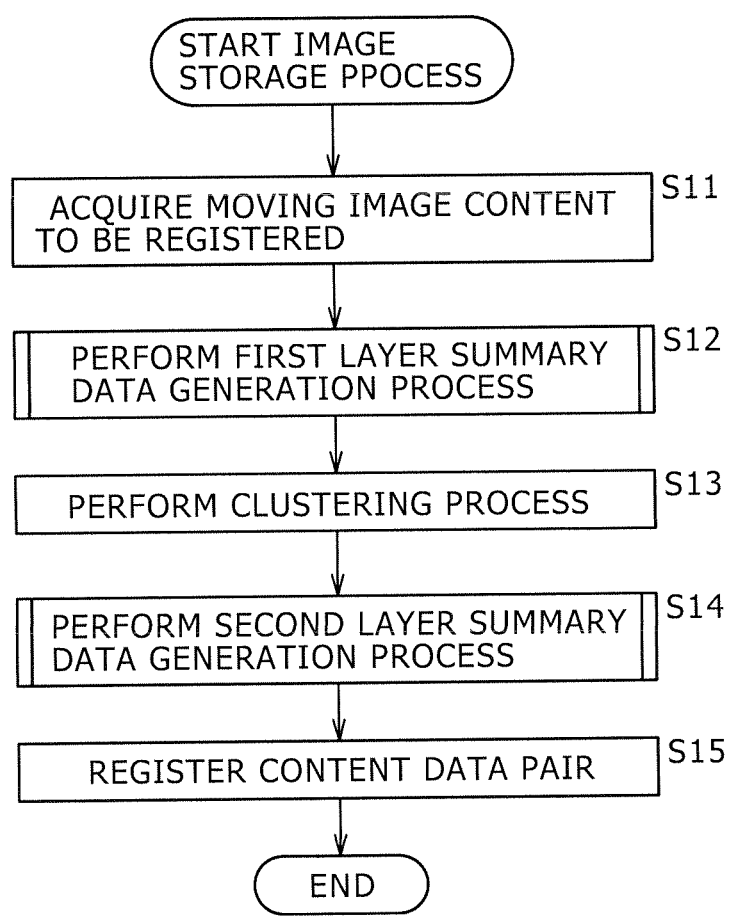
FIG. 2 is a flowchart explanatory of an image storage process.

Explained below in reference to the flowchart of FIG. 2 is the moving image content storage process performed by the image processing apparatus 11 shown in FIG. 1.

In step S11, the image acquisition unit 21 acquires the moving image content to be stored into the storage unit 24, and stores the acquired content into the buffer 22.

In step S12, the moving image content data registration unit 23 reads the moving data content from the buffer 22, performs a first layer summary data generation process to generate first layer summary data, and registers the generated summary data to the first layer summary data database 101 of the storage unit 24.

[First Layer Summary Data Generation Process]

Figure 3:
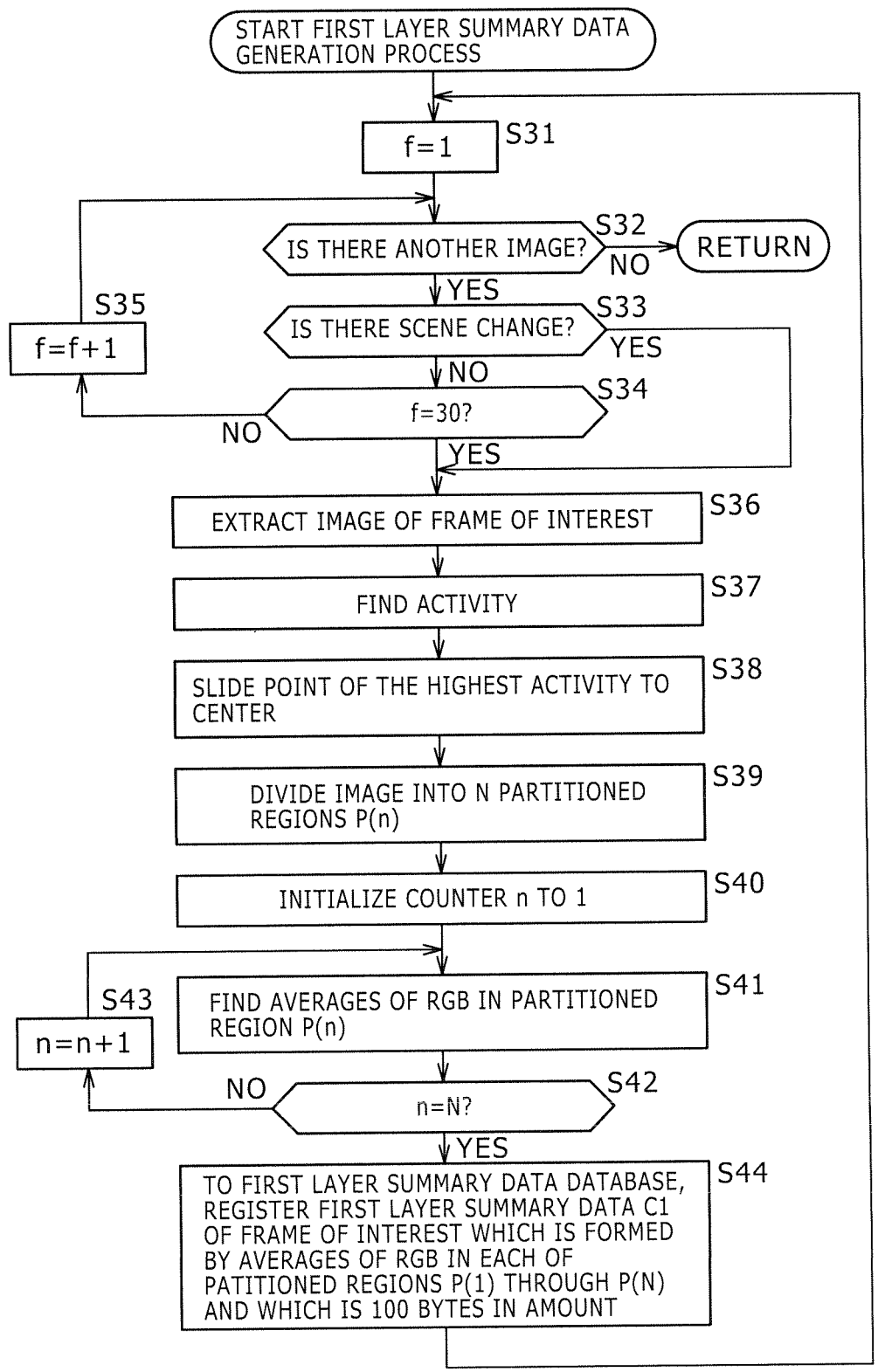
FIG. 3 is a flowchart explanatory of a first layer summary data generation process.

The first layer summary data generation process is explained below in reference to the flowchart of FIG. 3.

In step S31, the moving image content data registration unit 23 initializes to "1" a counter "f" that counts the frame.

In step S32, the moving image content data registration unit 23 reads sequentially the moving image content to determine whether there is another frame image yet to be processed. If another unprocessed frame image is not determined to exist in step S32, the first layer summary data generation process is terminated. If in step S32 another unprocessed frame image of the moving image content is determined to exist, then control is transferred to step S33.

In step S33, the first layer summary data generation section 43 controls the scene change detection block 63 to determine whether the supplied frame image represents a scene change upon comparison with the immediately preceding image. For example, the scene change detection block 63 obtains the total sum of the difference values of the pixel values between the pixels of the frame image to be processed and the pixels of the immediately preceding image. If the obtained total sum is found larger than a predetermined threshold value, then a scene change is determined to have occurred. That is, in the case of continuous moving images, the change between the current frame image and the immediately preceding frame image is considered small and thus the total sum of the difference values of the pixel values is considered to be smaller than the predetermined threshold value. Upon occurrence of a scene change, the frame image is often quite different from the immediately preceding frame image and thus the total sum of the difference values of the pixel values between the pixels is considered to vary significantly. Given these considerations, the scene change detection block 63 compares the total sum of the difference values of the pixel values between the pixels with the predetermined threshold value to determine whether a scene change has occurred.

If in step S33 no scene change is determined to have occurred because the total sum of the difference values of the pixel values between the current and the immediately preceding frame images is smaller than the threshold value, then control is transferred to step S34.

In step S34, the moving image content data registration unit 23 determines whether the counter "f" is set to 30. If the counter "f" is not at 30, control is transferred to step S35 in which the counter "f" is incremented by 1, and step S32 is reached again. That is, unless a scene change takes place, steps S32 through S35 are repeated until 30 frames elapse.

If in step S33 a scene change is determined to have occurred because the total sum of the difference values of the pixel values between the current and the immediately preceding frame images is larger than the threshold value, or if in step S34 the counter "f" is at 30, then control is transferred to step S36.

In step S36, the moving image content data registration unit 23 extracts from the buffer 22 the image of the frame of interest that is the 30th frame from the immediately preceding frame.

In step S37, the moving image content data registration unit 23 controls the activity calculation section 41 to calculate activities in the extracted image of the frame of interest. More specifically, the activity calculation section 41 calculates the sum of the differences between pixels horizontally and vertically adjacent to each other as the activity of each pixel. The activity calculation section 41 performs the same calculations on all pixels to obtain an activity image formed by the activities of the pixel values regarding every pixel.

In step S38, the moving image content data registration unit 23 controls the image slide section 42 to move, within the obtained activity image, the position of the pixel with the highest activity to the center of the image constituting the frame of interest. That is, since the position of high activity in an image visually attracts the human's attention the most, that position is slid into the center of the image so that that position will draw the viewer's attention most easily. This arrangement normalizes subsequent processing. If there exist a plurality of pixels having the highest activity each, then the viewer's attention is drawn to an object formed by these highest-activity pixels. In this case, the center of gravity of these pixels may be moved into the center of the image making up the frame of interest.

Figure 4:
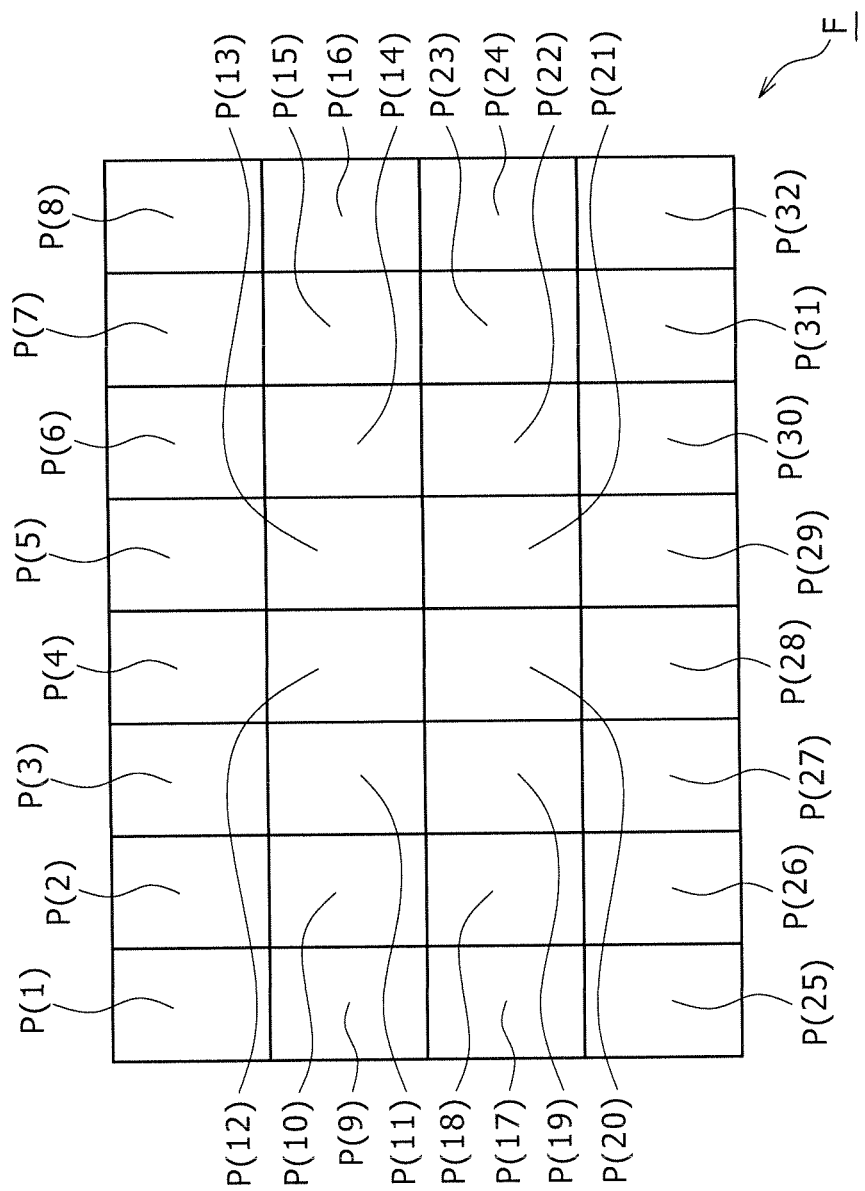
FIG. 4 is a schematic view explanatory of the first layer summary data generation process.

In step S39, the first layer summary data generation section 43 controls the image division block 61 to divide into N partitioned regions P(n) the F-th frame of which the center position is slid. For example, if the number N is 32, then the F-th frame is divided into partitioned regions P(1) through P(32) as shown in FIG. 4.

In step S40, the first layer summary data generation section 43 initializes to 1 a counter "n" that counts the partitioned region P(n).

In step S41, the first layer summary data generation section 43 controls the RGB pixel value average calculation block 62 to calculate averages of the pixel values regarding each of the RGB pixels in each of the partitioned regions.

In step S42, the first layer summary data generation section 43 determines whether the counter "n" is at a predetermined number N of partitions. In the example of FIG. 4, the first layer summary data generation section 43 determines whether the counter "n" is at the predetermined partition count N=32. If in step S42 the counter "n" is not determined to have the predetermined partition count N, then step S43 is reached. In step S43, the first layer summary data generation section 43 increments the counter "n" by 1, and control is returned to step S41. That is, the averages of the pixel values regarding each of the RGB pixels in all partitioned regions P(n) are obtained.

If in step S42 the counter "n" is determined to have reached the partition count N, then control is transferred to step S43.

In step S44, the first layer summary data generation section 43 then obtains first layer summary data C1 which is formed by the vector with its elements composed of the calculated pixel value averages regarding each of the RGB pixels in each of the partitioned regions P(1) through P(N) and which is about 100 bytes in amount, and registers the acquired first layer summary data C1 to the first layer summary data database 101 for storage into the storage unit 24. Control is then returned to step S31.

When the above steps have been carried out, the frames of interest are obtained sequentially from the target moving image content at intervals of 30 frames or upon each scene change. Each of the frames of interest is divided into a predetermined number of partitioned regions P(n), and the pixel value averages regarding each of the RGB pixels in each partitioned region are obtained. Then the first layer summary data C1 which is formed by the vector with its elements composed of the calculated pixel value averages regarding each of the RGB pixels in each of the partitioned regions P(n) and which is about 100 bytes in amount is obtained and registered sequentially to the first layer summary data database 101. For example, if the frame of interest is divided into 32 partitioned regions as shown in FIG. 4 and if each of the RGB pixels indicative of one of 16 gradations is expressed by one byte, then the first layer summary data C1 is formed by a vector of 96 dimensions composed of 96 bytes each representing one element of the vector. For this reason, the information registered in the first layer summary data database 101 may be considered to be feature quantities made up of sets of the vectors constituting the first layer summary data excluding chronological information.

The explanation is now returned to the flowchart of FIG. 2.

In step S12, the first layer summary data of the moving image data to be registered is registered to the first layer summary data database 101 of the storage unit 24. In step S13, the clustering section 45 performs a clustering process thereby classifying the first layer summary data of the moving image content to be registered.

[Clustering Process]

Figure 5:
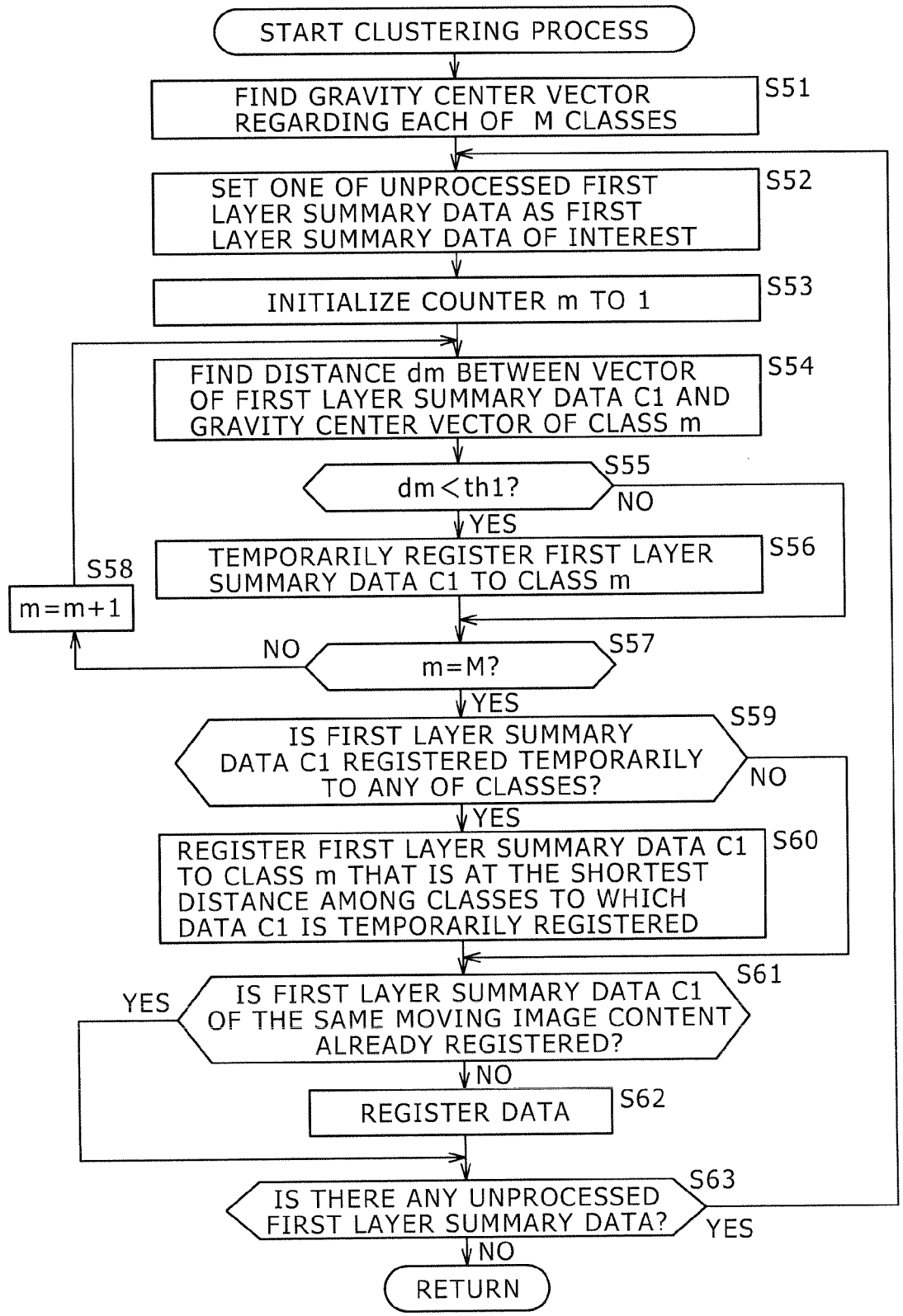
FIG. 5 is a flowchart explanatory of a clustering process.

The clustering process is explained below in reference to the flowchart of FIG. 5.

In step S51, from the first layer summary data registered in the first layer summary data database 101, the clustering section 45 extracts those data which are clustered into classes and which exclude the moving image content to be registered. Also, the clustering section 45 controls the gravity center calculation block 81 to calculate the gravity center vector of the vectors made up of the first layer summary data clustered in the same class. For example, with regard to the class A shown in FIG. 1, the clustering section 45 controls the gravity center calculation block 81 to calculate the gravity center vector of the vectors composed of the first layer summary data corresponding to each of the content data pairs 102-1 through 102-a of the class A. In like manner, the clustering section 45 causes the gravity center calculation block 81 to calculate the gravity center vector of the vectors made up of the first layer summary darn corresponding to each of the classes B through D.

In step S52, out of the first layer summary data of the moving image data to be registered, the clustering section 45 sets unprocessed summary data as the first layer summary data C1 to be processed.

In step S53, the clustering section 45 initializes to 1 a counter "m" that counts the class.

In step S54, the clustering section 45 controls the distance calculation block 82 to calculate the distance dm between the vector constituting the first layer summary data C1 to be processed and the gravity center vector of the class "m." More specifically, the distance calculation block 82 may use square norm in calculating a distance dm between the vectors.

In step S55, the clustering section 45 determines whether the vector-to-vector distance dm thus obtained is smaller than a predetermined threshold value th1. If the vector-to-vector-distance dm is determined to be smaller than the threshold value th1, control is transferred to step S56.

In step S56, the clustering section 45 temporarily registers the first layer summary data C1 targeted to be processed to the class "m."

In step S57, the clustering section 45 determines whether the counter "m" has reached the number M of clustered classes. If it is determined that the counter "m" has yet to reach the number M, control is transferred to step S58. In step S58, the clustering section 45 increments the counter "m" by 1, and control is returned to step S54. That is, steps S54 through S58 are repeated until the distance between the gravity center vector of every class and the vector of the first layer summary data C1 is determined to be smaller than the predetermined threshold value th1.

If in step S57 the counter "m" is determined to have reached the class count M, step S59 is reached. In step S59, the clustering section 45 determines whether the first layer summary data C1 targeted to be processed is clustered into any of the classes and temporarily registered thereto. If the first layer summary data C1 is determined to have been clustered into any of the classes and temporarily registered thereto, then control is transferred to step S60.

In step S60, from among the classes to which the first layer summary data C1 to be processed is temporarily registered, the clustering section 45 clusters the first layer summary data C1 into the class "m" that is at the shortest distance dm. That is, where the first layer summary data C1 to be processed has temporarily been registered to a plurality of classes, the summary data needs to be definitively clustered to one of the classes. Thus the first layer summary data C1 to be processed is clustered into the class whose gravity center vector is the closest to the vector of the first layer summary data C1 in question (i.e., clustered into the most similar class).

In step S61, the clustering section 45 determines whether the first layer summary data of the same moving image content has already been registered to the selected class. If in step S61 no first layer summary data of the same moving image content is determined to be registered to the selected class, then step S62 is reached. In step S62, the clustering section 45 clusters the first layer summary data C1 targeted to be processed into the selected class and thereby registers the summary data C1 to the first layer summary data database 101.

If in step S59 the first layer summary data C1 in question has yet to be clustered into any of the classes, or if in step S61 the first layer summary data of the same moving image content has already been registered to the selected class, then control is transferred to step S63.

In step S63, the clustering section 45 determines whether there is any unprocessed first layer summary data left in the moving image content to be registered. If such unprocessed first layer summary data is determined to exist, then control is returned to step S52. That is, steps S52 through S63 are repeated until the unprocessed first layer summary data have been exhausted in the moving image content of the sample data.

If in step S63 no further unprocessed first layer summary data is determined to exist in the moving image content to be registered, then the clustering process is brought to an end.

When the above steps have been carried out, a maximum of one first layer summary data item is clustered into each class with regard to the first layer summary data of the moving image content to be registered.

The explanation is now returned to the flowchart of FIG. 2.

In step S13, a maximum of one first layer summary data item is clustered into each class regarding the first layer summary data of the moving image content targeted to be registered. Control is then transferred to step S14.

In step S14, the second layer summary data generation section 44 performs a second layer summary data generation process to generate a second layer summary data file 112 made of the second layer summary data. The second layer summary data generation section 44 stores the generated second layer summary data file 112 into the storage unit 24 together with a moving image content file 111 in the form of a content data pair 102.

[Second Layer Summary Data Generation Process]

Figure 6:
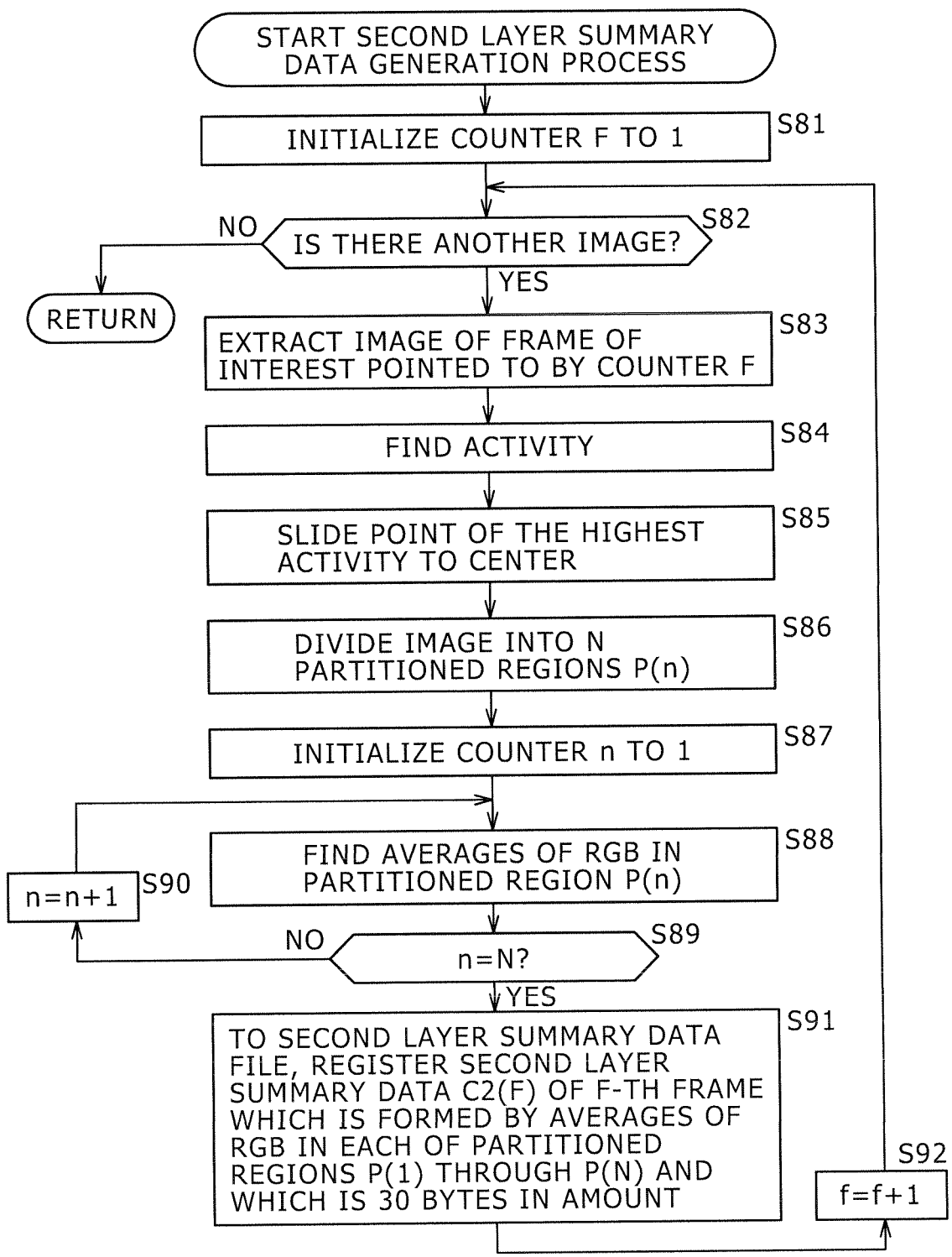
FIG. 6 is a schematic view explanatory of a second layer summary data generation process.

The second layer summary data generation process is explained below in reference to the flowchart of FIG. 6.

In step S81, the moving image content data registration unit 23 initializes to 1 a counter F that counts the number of frames.

In step S82, the moving image content data registration unit 23 determines whether there is another frame image which is held in the buffer 22 and which is part of the moving image content to be registered. If there is no further frame image left in the moving image content, the second layer summary data generation process is terminated. If another frame image is determined to exist in step S82, control is transferred to step S83.

In step S83, the moving image content data registration unit 23 extracts from the buffer 22 the frame (F) as the image of the frame of interest.

In step S84, the moving image content data registration unit 23 controls the activity calculation section 41 to calculate an activity image regarding the image of the extracted frame of interest.

In step S85, the moving image content data registration unit 23 controls the image slide section 41 to slide, within the obtained activity image, the position of the pixel with the highest activity to the center of the image of the frame of interest.

In step S86, the second layer summary data generation section 44 controls the image division block 71 to divide the F-th frame of which the center position is slid, into N partitioned regions P(n).

In step S87, the second layer summary data generation section 44 initializes to 1 the counter "n" that counts the partitioned region P(n).

In step S88, the second layer summary data generation section 44 controls the RGB pixel value average calculation block 72 to obtain averages of the pixel values regarding each of the RGB pixels in the partitioned region P(n).

In step S89, the second layer summary data generation section 44 determines whether the counter "n" is at a predetermined partition count N. If in step S89 the counter "n" is not determined to have reached the predetermined partition count N, then step S90 is reached. In step S90, the second layer summary data generation section 44 increments the counter "n" by 1, and control is returned to step S88. That is, the averages of the pixel values regarding each of the RGB pixels in all partitioned regions P(n) are acquired.

If in step S90 the counter "n" is determined to have reached the partition count N, then control is transferred to step S91.

In step S91, the second layer summary data generation section 44 registers to a new second layer summary data file 112 second layer summary data C2 which is formed by a vector with its elements composed of the calculated pixel value averages regarding each of the RGB pixels in each of the partitioned regions P(1) through P(N) and which is about 30 bytes in amount. In this case, the second layer summary data generation section 44 registers the second layer summary data C2 to the new second layer summary data file 112 in the order of processed frames for storage into the storage unit 24.

In step S92, the counter F is incremented by 1. Control is then returned to step S82.

When the above steps have been carried out, each of the frames making up the moving image content is taken sequentially as the frame of interest and divided into the predetermined number of partitioned regions P(n). The averages of the pixel values regarding each of the RGB in each frame of interest are obtained. The second layer summary data C2 which is a vector with its elements composed of the pixel value averages regarding each the RGB pixels in each of the partitioned regions P(n) and which is about 30 bytes in amount is registered sequentially to the second layer summary data file 112 in the order of processed frames. For example, if the frame of interest is divided into 32 partitioned regions as shown in FIG. 4 and if each of the RGB pixels indicative of one of four gradations is expressed by two bits, then one second layer summary data item C2 is formed by a vector of 96 dimensions composed of 24 bytes. Also, the second layer summary data file 112 is structured in such a manner that the second layer summary data C2 is stored therein chronologically in order of frames. For this reason, the data made up of the second layer summary data C2 stored in the order of frames in the second layer summary data file 112 may be said to constitute feature quantities composed of the vectors of the second layer summary data C2 containing chronological information.

The explanation is now returned to the flowchart of FIG. 2.

In step S14, the second layer summary data file 112 is generated in the second layer summary data generation process. Control is then transferred to step S15.

In step S15, the moving image content data registration unit 23 registers to the storage unit 24 the content data pair 102 constituted by the moving image content file 111 made of the moving image content to be registered and by the corresponding second layer summary data file 112.

Where the moving image content is registered by carrying out the above steps, the first layer summary data extracted either at intervals of a predetermined number of frames or in units of a frame occurring upon scene change is registered to the first layer summary data database 101. Also, the second layer summary data extracted in units of a frame is registered in the order of frames as the second layer summary data file 112. The second layer summary data file 112 is paired with the moving image content file 111 to make up the content data pair 102 that is stored into the storage unit 24.

The information in the first layer summary data database 101 is registered therein solely as the first layer summary data C1 constituting a database extracted not in units of a frame but at intervals of a predetermined number of frames or in units of a frame occurring upon scene change. Thus the information in the first layer summary data database 101 has no chronological information and is registered to serve as a database conducive to enhanced data search. For this reason, the information in the first layer summary data database 101 is considered to offer feature quantities highly suitable for determining the moving image content of the sample data targeted for search through comparisons with the data of the moving image content of the target sample data for search.

Because the first layer summary data is clustered when registered to the first layer summary data database 101, it is possible, upon search for given first layer summary data, to determine which class the first layer summary data of interest belongs to, before searching the determined class for the first layer summary data in question. This arrangement can boost the speed of search.

[Initial Clustering Process]

Figure 7:
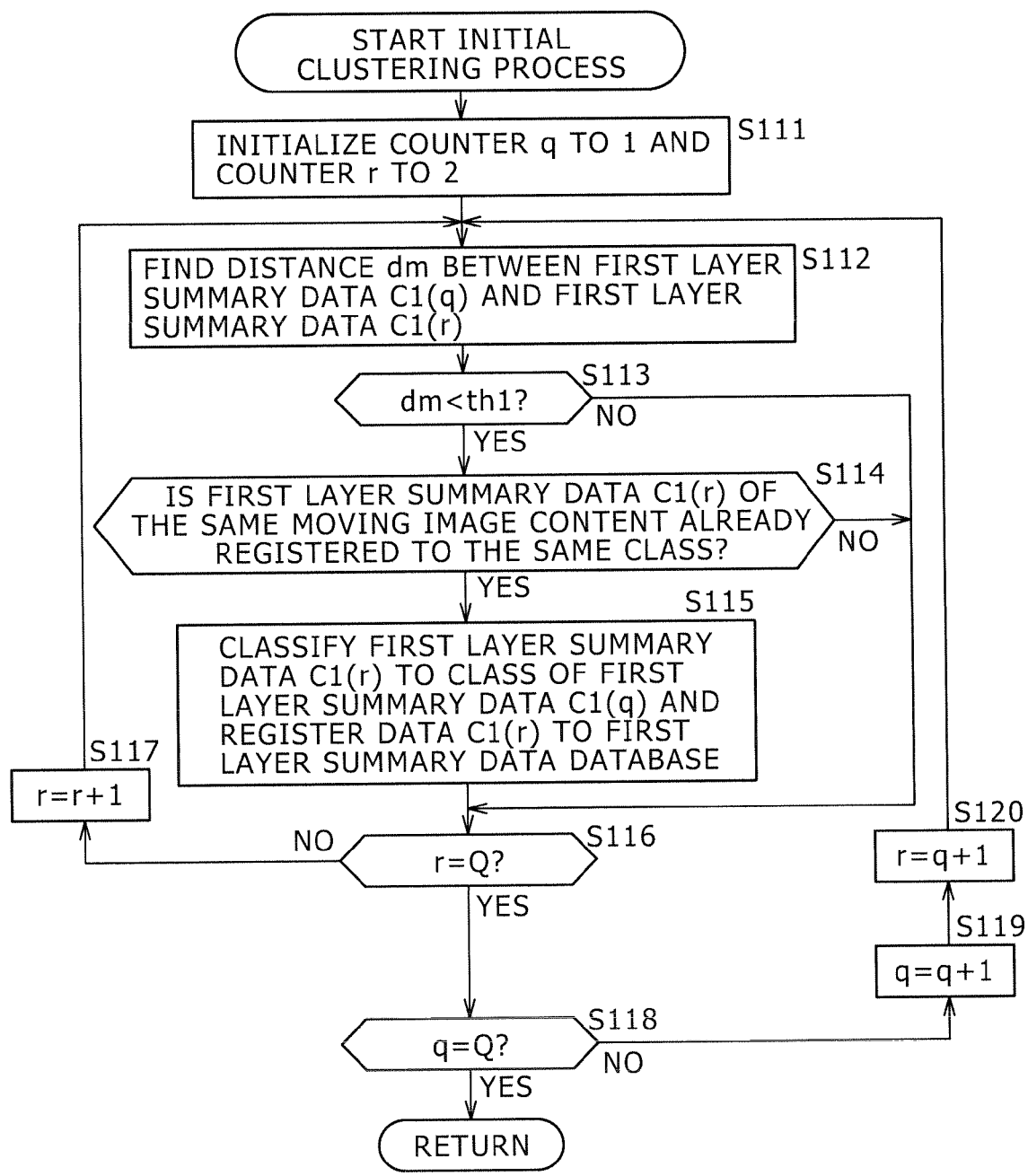
FIG. 7 is a flowchart explanatory of an initial clustering process.

For the preceding steps, it was assumed that all moving image content files 111 registered in the storage unit 24 have already been clustered into classes. However, if the moving image content files 111 are registered in the storage unit 24 without being clustered, an initial clustering process is needed. The initial clustering process is explained below in reference to the flowchart of FIG. 7. It is assumed here that the first layer summary data about all moving image contents have already been registered to the first layer summary data database 101 following the first layer summary data generation process. Thus it is assumed that the moving image contents are stored in the storage unit 24 without being clustered in steps S11, S12, S14 and S15 (step S13 is excluded) in the flowchart of FIG. 2.

In step S111, the clustering section 45 initializes counters "q" and "r" to 1 and 2, respectively. The counter "q" identifies the first layer summary data C1($q$) of interest and the counter "r" identifies the first layer summary data C1($r$) targeted for comparison within the first layer summary data database 101.

In step S112, the clustering section 45 controls the distance calculation block 82 to calculate the distance dm between the first layer summary data C1($q$) and the first layer summary data C1($r$).

In step S113, the clustering section 45 determines whether the calculated distance dm is shorter than a predetermined threshold value th1. If the distance dm is determined to be shorter than the threshold value th1 (i.e., where a similarity is detected), then control is transferred to step S114.

In step S114, the clustering section 45 causes the initial registration block 83 to determine whether any other first layer summary data C1 of the moving image content to which the first layer summary data C1($r$) belongs has already been clustered and registered to the same class as the first layer summary data C1($q$) of interest.

If in step S114 it is determined that any other first layer summary data C1 of the moving image content to which the first layer summary data C1($r$) belongs has yet to be clustered and registered to the same class as the first layer summary data C1($q$) of interest, then control is transferred to step S115.

In step S115, the initial registration block 83 clusters the first layer summary data C1($r$) into the same class as the first layer summary data C1($q$) before registering the summary data C1($r$).

That is, if the first layer summary data C1($r$) clustered into the same class as the first layer summary data C1($q$) and targeted for comparison with other summary data is already registered, then a plurality of different first layer summary data derived from the same moving image content would be registered to the same class. Since each class is supposed to accommodate similar or matched frame images between moving image contents, there is no need to register a plurality of first layer summary data of the same moving image content to the same class. For this reason, the first layer summary data C1($r$) targeted for comparison is clustered and registered to the same class as the first layer summary data C1($q$) of interest only if no other first layer summary data of the same moving image content has already been registered.

In step S116, the clustering section 45 determines whether the counter "r" has reached a total count Q of the first layer summary data C1. If the counter "r" is not determined to be at the total count Q, then step S117 is reached. In step S117, the counter "r" is incremented by 1, and control is returned to step S112.

If in step S113 the distance dm is determined to be longer than the predetermined threshold value th1, or if in step S114 it is determined that some other first layer summary data C1($r$) targeted for comparison and belonging to the same class as the first layer summary data C1($q$) of interest has already been clustered and registered, then step S115 is skipped. Control is then transferred to step S116.

That is, steps S112 through S116 are repeated until the first layer summary data C1($q$) of interest has been compared with all other first layer summary data C1($r$) targeted for comparison.

If the counter "r" is determined to have reached the total count Q in step S116, step S118 is reached. In step S118, the clustering section 45 determines whether the counter "q" has reached the total count Q. If the counter "q" is not determined to have reached the total count Q in step S116, then step S119 is reached. In step S119, the clustering section 45 increments the counter "q" by 1. Then in step S120, the clustering section 45 sets the counter "r" to a value larger than that on the counter "q." Control is then returned to step S112.

That is, there is no need to perform duplicate comparisons between the first layer summary data in the first layer summary data database 101. The first layer summary data C1(r) targeted for comparison with the first layer summary data C1(q) of interest need only be larger than the value on the counter "q." Therefore the counter "r" counts the number of times the process is performed starting from q+1 to the total count Q. Steps S112 through S120 are repeated until these comparisons have been carried out between all first layer summary data.

If in step S118 the counter "q" is determined to have reached the total count Q, then the initial clustering process is brought to an end.

Figure 8:
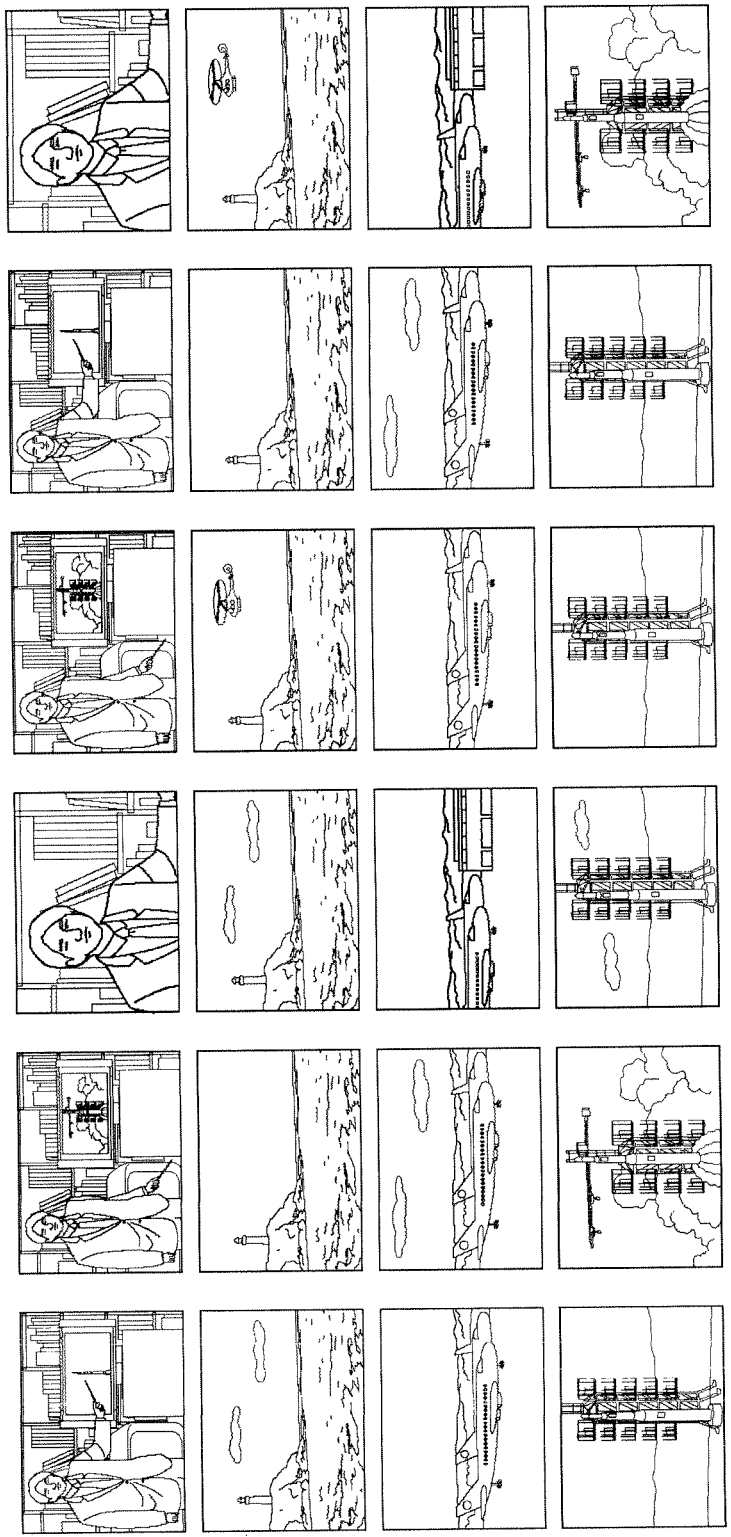
FIG. 8 is a schematic view explanatory of the initial clustering process.

When the above steps have been carried out, similar or matched first layer summary data are clustered into the same class. Also, a maximum of one first layer summary data item belonging to the same moving image content is clustered into each class. As a result, if each class is formed by deriving, say, six first layer summary data items from different moving image contents, then there are extracted six frame images such as those shown in the top row of FIG. 8 indicating the same person. Alternatively, there may be extracted six frame images in the second row from the top in FIG. 8 showing the same lighthouse and the sea, six frame images in the third row from the top showing two aircraft, or six frame images in the fourth row from the top showing the same rocket launching pad. The six frame images in each of the rows in FIG. 8 are clustered into the same class. That is, the first layer summary data made up of the six frame images in each row of FIG. 8 constitute the images of which the vector-to-vector distances fall within a predetermined range.

Figure 9:
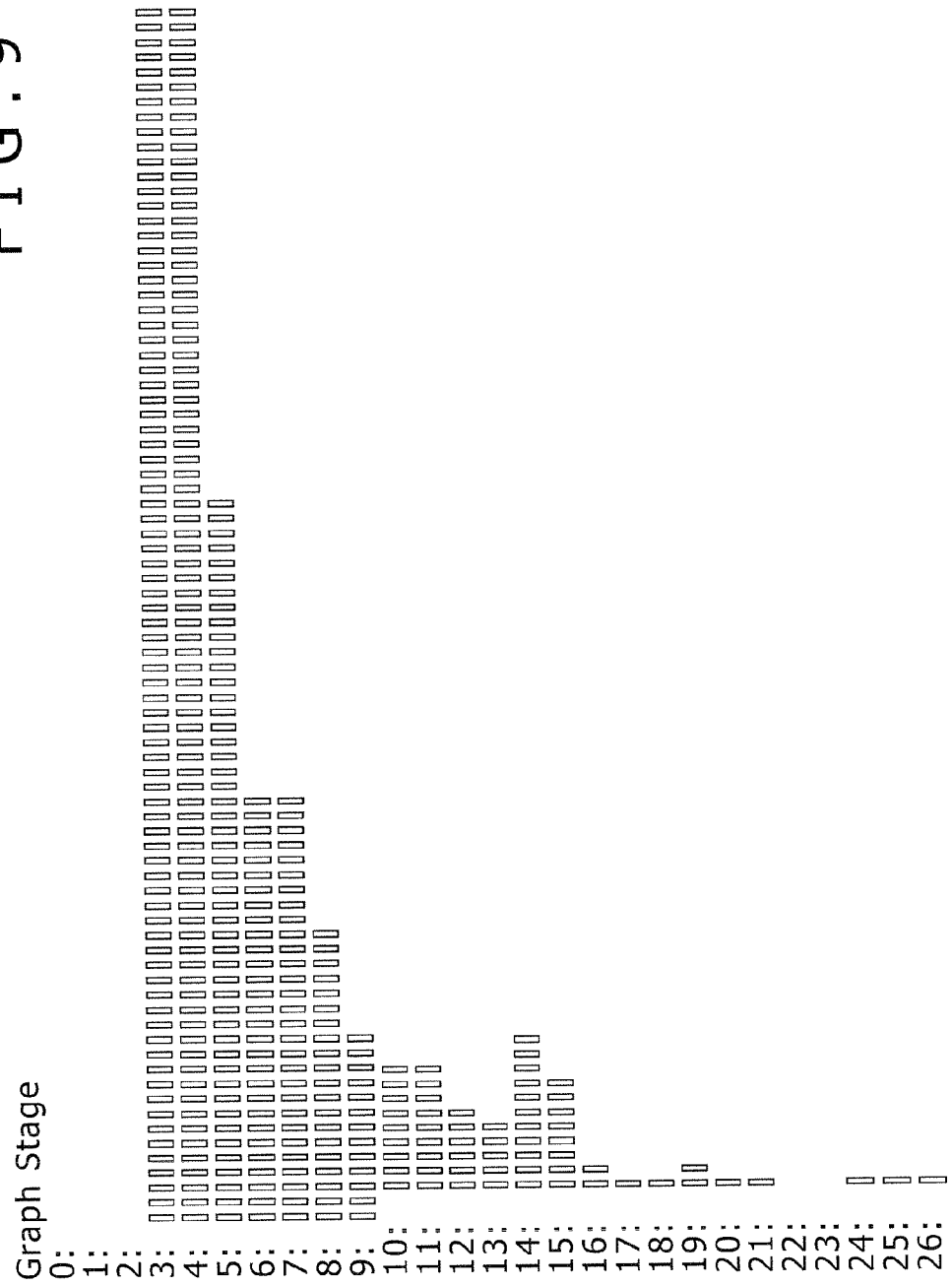
FIG. 9 is another schematic view explanatory of the initial clustering process.

When the number of classes is obtained for each of the numbers of the first layer summary data clustered into the same class, a tendency such as one shown in FIG. 9 is known to appear. That is, in FIG. 9, the vertical axis denotes the number of the first layer summary data clustered into the same class (i.e., number of the frame images clustered into the same class), and the horizontal axis represents the number of classes. Consequently, it can be seen that there are numerous classes each having a small number (e.g., 3 to 5) of first layer summary data items clustered thereinto and that there exist an extremely small number of classes each having a large number (e.g., 16 or more) of first layer summary data items clustered thereinto. From this, it is understood that identifying one of the classes having the numerous first layer summary data items therein can also identify the corresponding moving image content. Thus upon search for a given moving image content, it can be seen that the load involved in the search process is reduced and the speed of search is improved by identifying the class and by making comparisons with the first layer summary data belonging to the identified class. It is also possible to perform data mining using the class distribution unmodified such as is shown in FIG. 9. For example, where the same TV program is stored every day as moving image contents, it is possible statistically to analyze the scenes that have been utilized with a high frequency in a given month.

[Search and Extraction Process]

Figure 10:
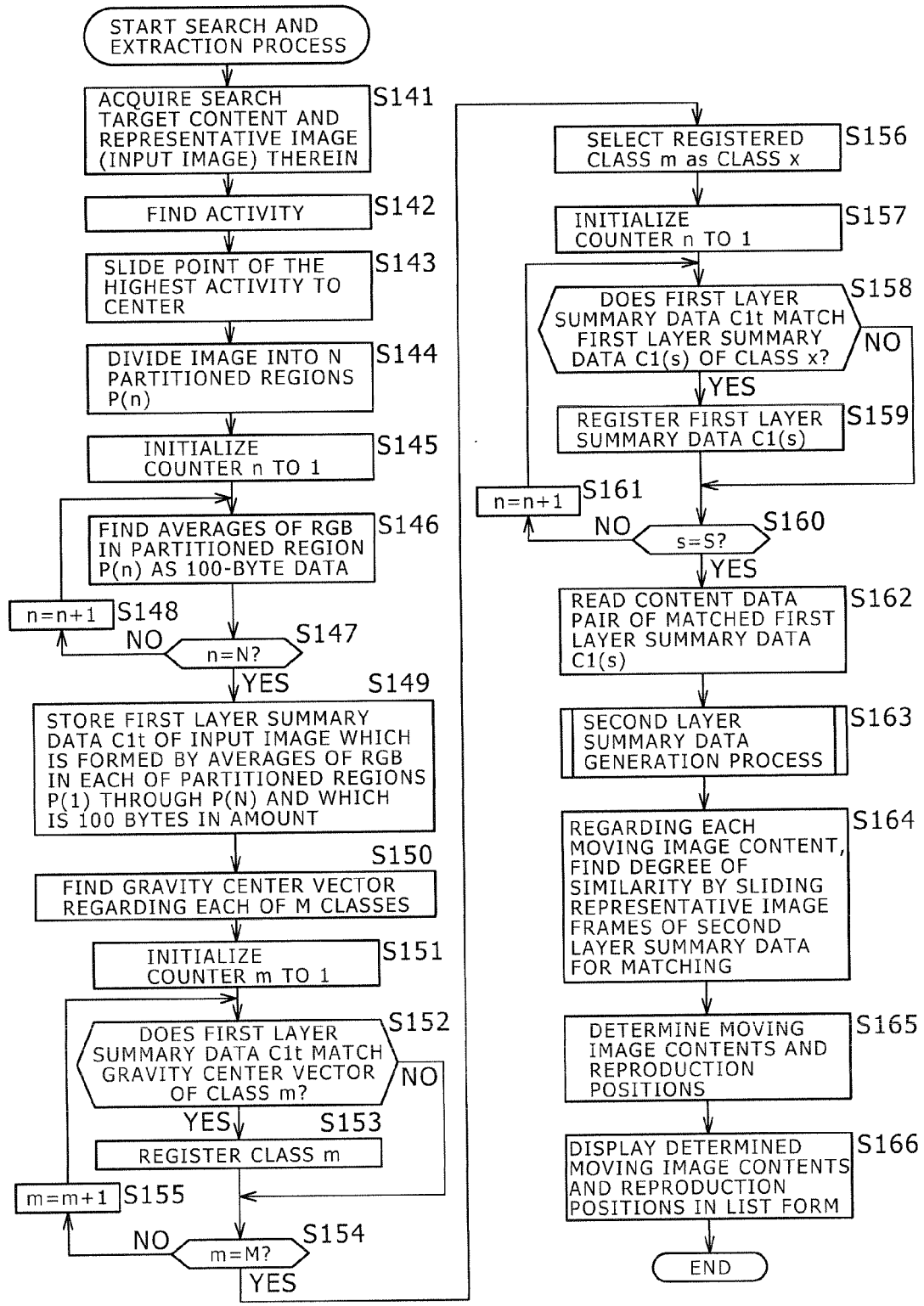
FIG. 10 is a flowchart explanatory of a search and extraction process.

A search and extraction process is explained below in reference to the flowchart of FIG. 10.

In step S141, the image acquisition unit 21 acquires the moving image content making up the sample data of the moving image content targeted for search, and stores the acquired content into the buffer 22.

In step S142, the search and extraction unit 25 extracts the image of the frame constituting a representative image from the moving image of the sample data held in the buffer 22. Also, the search and extraction unit 25 controls the activity calculation section 151 to calculate an activity image of the frame making up the representative image of the moving image content targeted for search.

In step S143, the search and extraction unit 25 controls the image slide section 152 to move, within the acquired activity image, the position of the pixel with the highest activity into the center of the image of the frame constituting the representative image.

In step S144, the first layer summary data search section 153 controls the image division block 171 to divide into N partitioned regions P(n) the frame making up the representative image of which the center position is slid.

In step S145, the first layer summary data search section 153 initializes to 1 the counter "n" that counts the partitioned region P(n).

In step S146, the first layer summary data search section 153 controls the RGB pixel value average calculation block 172 to obtain averages of the pixel values regarding each of the RGB pixels in the partitioned region P(n).

In step S147, the first layer summary data search section 153 determines whether the counter "n" is at a predetermined partition count N. If in step S147 the counter "n" is not determined to have reached the predetermined partition count N, step S148 is reached. In step S148, the first layer summary data search section 153 increments the counter "n" by 1, and control is returned to step S146. That is, the averages of the pixel values regarding each of the RGB pixels in all partitioned regions P(n) are obtained.

If in step S147 the counter "n" is determined to have reached the partition count N, control is transferred to step S149.

In step S149, the first layer summary data search section 153 stores the first layer summary data C1t which is formed by a vector with its elements composed of the calculated pixel value averages regarding each of the RGB pixels in each of the partitioned regions P(1) through P(N), which is about 100 bytes in amount, and which makes up the representative image of the sample data with regard to the moving image content targeted for search. Control is then transferred to step S150.

In step S150, the class search section 155 extracts the first layer summary data clustered into classes from among those first layer summary data registered in the first layer summary data database 101. Also, the class search section 155 controls the gravity center calculation block 191 to calculate the gravity center vector of the vectors made up of the first layer summary data clustered into the same class.

In step S151, the class search section 155 initializes to 1 the counter "m" that identifies the class.

In step S152, the class search section 155 controls a comparison block 192 to compare the vector of the first layer summary data C1t of the frame of the representative image with the gravity center vector of the class "m" so as to determine a match (or a similarity) therebetween. In this case, the vectors of, say, (3, 4, 0, 4) and (2, 4, 1, 4) expressed in three bits using values ranging from 0 to 7 are mapped to vectors (1, 2, 0, 2) and (1, 2, 0, 2) expressed in two bits using values 0 through 3. If such bit conversion between vectors results in a match or a similarity, then the vectors involved may be determined to be matched with or similar to one another. In another example, the vectors of, say, (3, 2, 3, 0) and (4, 2, 4, 0) in three bits result in (1, 1, 1, 0) and (2, 1, 2, 0) in two bits after undergoing simple three-to-two-bit conversion, the result being a mismatch. However, if supplemented by half the quantization step involved (i.e., 1), the initial three-bit vectors are made into vectors (4, 3, 4, 1) and (5, 3, 5, 1) which in turn result in vectors (2, 1, 2, 0) and (2, 1, 2, 0) following three-to-two-bit conversion, the result being a match. That is, if the vectors involved are found to match with each other or similar to one another when supplemented by half the quantization step followed by three-to-two-bit conversion during quantization, then such a match or a similarity may be recognized as valid. This arrangement makes it possible to reduce the raised possibility of mismatches stemming from an extremely narrow range of search dictated by the comparison between vectors being considered a match only upon perfect numerical match therebetween.

In step S152, it is determined whether the vector of the first layer summary data C1*t* matches the gravity center vector of the class "m." If the two vectors are determined to match with each other in step S152, then step S153 is reached. In step S153, the class search section 155 registers the class "m." If it is determined in step S152 that the vector of the first layer summary data C1*t* does not match the gravity center vector of the class "m," then step S153 is skipped.

In step S154, the class search section 155 determines whether the counter "m" has reached the class count M. If the counter "m" is not determined to have reached the class count M, then step S155 is reached. In step S155, the counter "m" is incremented by 1, and control is transferred to step S152.

When the comparisons with the gravity center vector of every class "m" have been completed, the counter "m" is determined to have reached the class count M in step S154. Control is then transferred to step S156.

In step S156, the first layer summary data search section 153 selects the set of the class "m" registered in step S153 as a class "x" targeted for processing. Alternatively, the class "x" may be arranged to represent a plurality of classes "m."

In step S157, the first layer summary data search section 153 initializes to 1 a counter "s" that identifies the first layer summary data C1(*s*) belonging to the class "x."

In step S158, the first layer summary data search section 153 controls the comparison block 173 to compare the vector of the first layer summary data C1*t* constituting the frame of the representative image on the one hand, and the vector of the first layer summary data C1(*s*) belonging to the class "x" on the other hand, in order to determine a match or a mismatch therebetween. Alternatively, as explained above in conjunction with the processing of step S152, a match between vectors may also be recognized following bit count conversion or subsequent to the alteration of the number of bits by addition of half the quantization step width involved.

If it is determined in step S158 that the vector of the first layer summary data C1*t* matches the vector of the first layer summary data C1(*s*) belonging to the class "x," then step S159 is reached. In step S159, the first layer summary data search section 153 registers the vector of the first layer summary data C1(*s*) belonging to the class "x." If it is determined in step S158 that the vector of the first layer summary data C1*t* does not match the vector of the first layer summary data C1(*s*) belonging to the class "x," then step S159 is skipped.

In step S160, the first layer summary data search section 153 determines whether the counter "s" has reached the total count S of the first layer summary data C1(*s*) belonging to the class "x." If the counter "s" is not determined to have reached the total count S, then step S161 is reached and the counter "s" is incremented by 1. Control is then returned to step S158.

Upon completion of the comparisons with the vectors of the first layer summary data C1(*s*) belonging to all classes "x," step S160 is reached. In step S160, the counter "s" is considered to have reached the total count S. Control is then transferred to step S162.

In step S162 is retrieved the content data pair 102 corresponding to the moving image content of the first layer summary data C1 that matches the vector of the first layer summary data C1*t* extracted from the sample data of the moving image content targeted for search, from among the vectors of the first layer summary data C1(*s*) belonging to the class "x."

In step S163, the second layer summary data search and extraction section 154 controls the image division block 181 and RGB pixel value average calculation block 182 in the same manner that the second layer summary data generation section 44 controls the image division block 71 and RGB pixel value average calculation block 72, thereby performing the second layer summary data generation process to generate the second layer summary data file 112 of the sample data of the moving image content targeted for search. The second layer summary data generation process is the same as the process explained above in reference to the flowchart of FIG. 6 and thus will not be discussed further.

In step S164, the second layer summary data search and extraction section 154 controls a slide matching search block 183 to slide the second layer summary data file of the sample data of the moving image content targeted for search and the second layer summary data file 112 included in the content data pair 102 retrieved in step S162, thereby obtaining a degree of similarity in terms of the differential absolute sum between the second layer summary data of the frames.

In step S165, based on the degree of similarity, the second layer summary data search and extraction section 154 determines the moving image content targeted for search and the reproduction position of the sample data in the moving image content. More specifically, if the smallest of the degrees of similarity obtained corresponding to the number of slid frames is smaller than a predetermined threshold value, then the second layer summary data search and extraction section 154 considers that the moving image content of the sample data matches the moving image content of the content data pair 102 retrieved in step S162, and thereby determines the moving image content of the sample data to be the moving image content targeted for search. In this case, the slide position at which the degree of similarity is the smallest is also determined to be the reproduction position of the sample data in the moving image content targeted for search.

Figure 11:
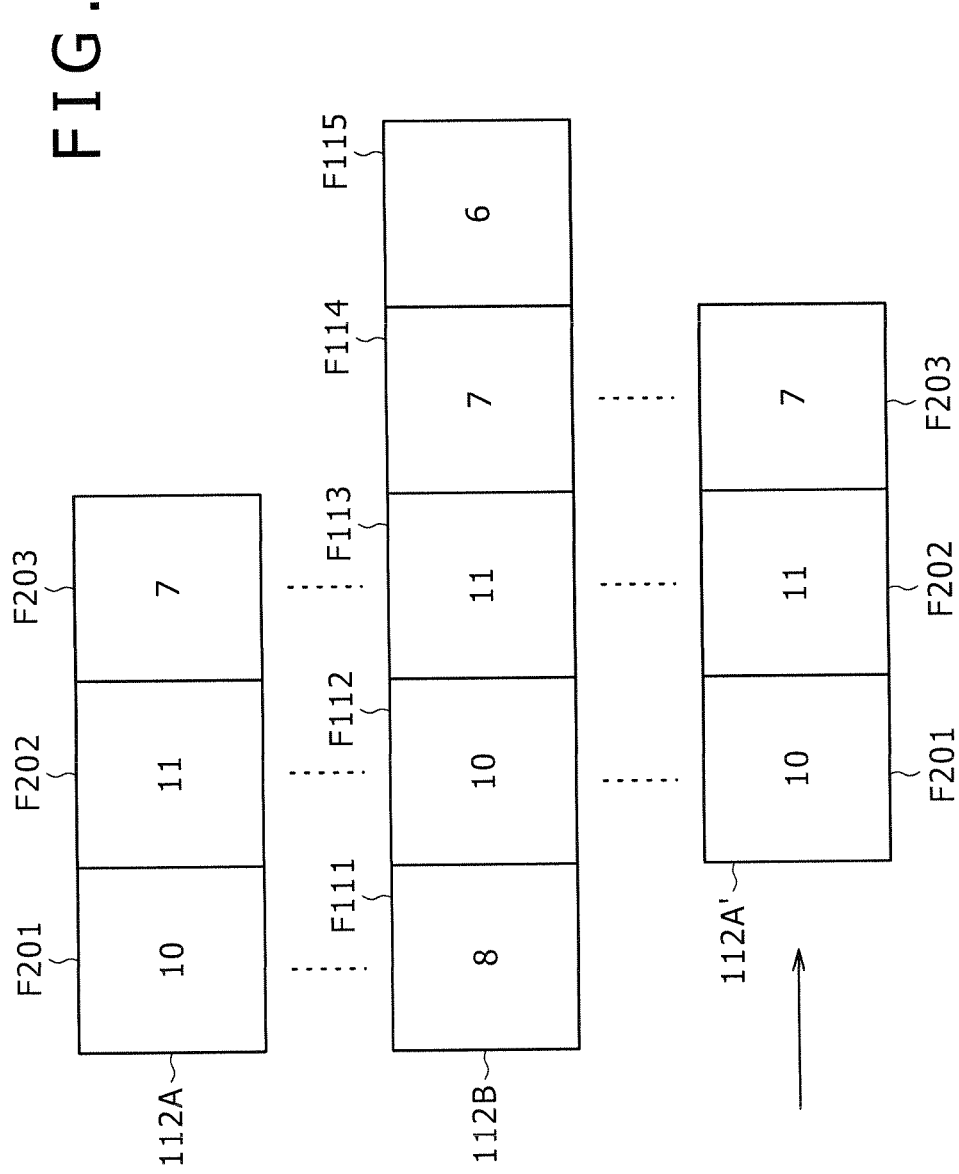
FIG. 11 is a schematic view explanatory of the search and extraction process.

That is, the slide matching search block 183 may typically obtain as the degree of similarity the differential absolute sum between a second layer summary data file 112A of the sample data shown in the top row of FIG. 11 on the one hand, and a second layer summary data file 112B retrieved in step S162 and shown in the second row of FIG. 11 on the other hand. In FIG. 11, the second layer summary data file 112A of the sample data is made up of frames F201 through F203. The second layer summary data of these frames are expressed as one-dimensional vectors designated by numerals 10, 11 and 7 in order of the frames. The second layer summary data file 112B is composed of frames F111 through F115. The second layer summary data of these frames are also expressed as one-dimensional vectors designated by numerals 8, 10, 11, 7 and 6 in order of the frames.

In an initial process, the degree of similarity is obtained as the differential absolute sum between the second layer summary data file 112A in the top row and the second layer summary data file 112B in the second row in order of the corresponding frames. In this case, the degree of similarity is acquired as 7 (=|10−8|+|11−10|+|7−11|). In the next process, the second layer summary data file 112A is slid right one frame as shown in the bottom row of FIG. 11. This provides the degree of similarity as 0 (=|10−10|+|11−11|+|7−7|). In this case, it is determined that the moving image content of the second layer summary data file 112B is the moving image content having been searched for from the moving image from which the second layer summary data file 112A was obtained. Also in this case, it is determined that the timing at which the moving image content targeted for search is matched is given as the frames F112 and F113 in the second layer summary data file 112B. This makes it possible to determine the reproduction position of the matched moving image. In the example of FIG. 11, the second layer summary data files are considered to have matched when the degree of similarity therebetween turns out to be 0. Alternatively, a match between the files may be recognized if the degree of similarity is found to be smaller than a predetermined threshold value.

Figure 12:
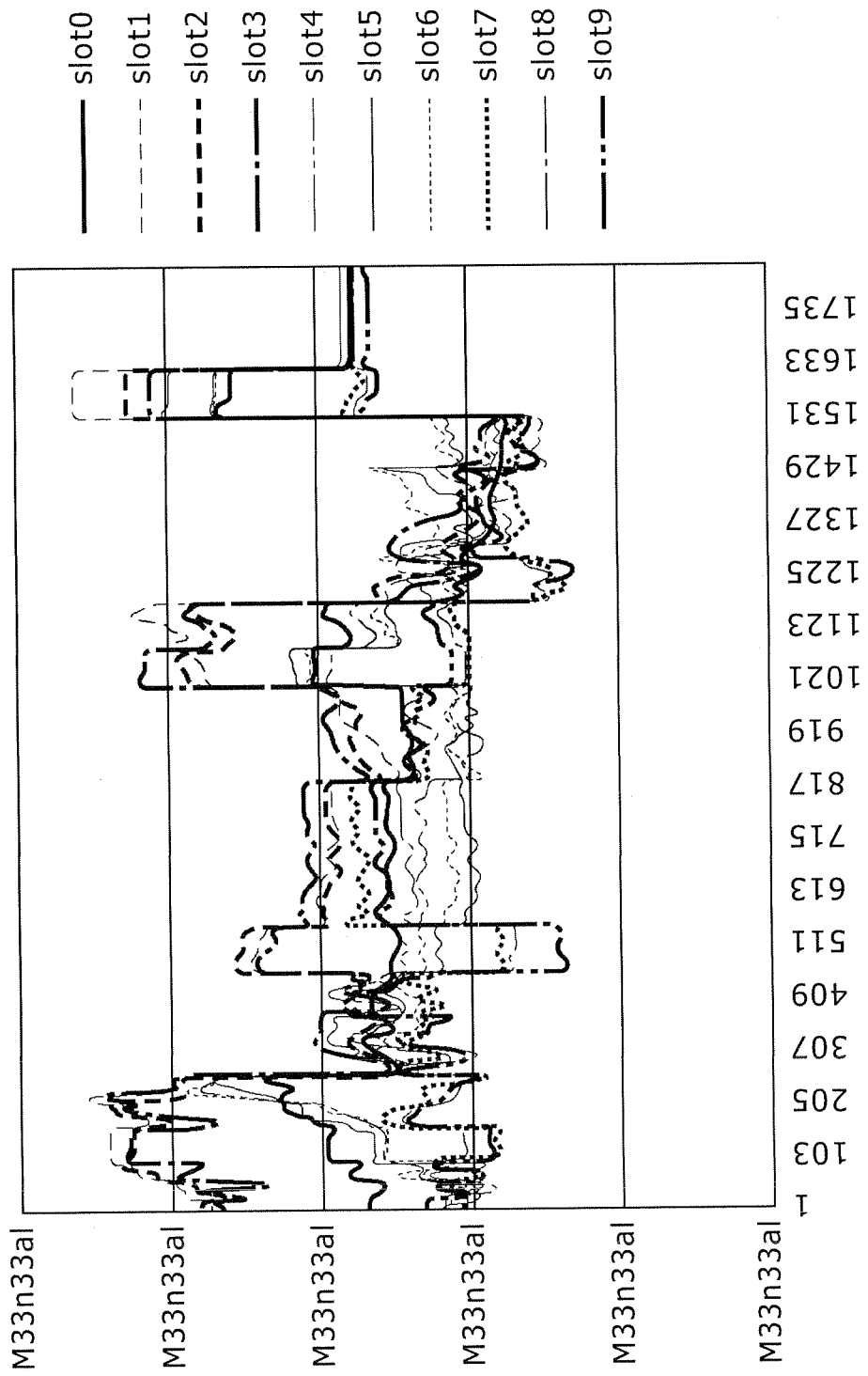
FIG. 12 is another schematic view explanatory of the search and extraction process.

For example, as shown in FIG. 12, where the changes in the second layer summary data of the corresponding frames between different moving image contents are found to be similar or matched therebetween, these contents may be considered the same moving image content.

In FIG. 12, slots 0 through 9 are identifiers identifying moving image contents. The horizontal axis in FIG. 12 represents frame numbers and the vertical axis denotes changes in the second layer summary data composed of the one-dimensional vector elements making up each frame. It should be noted that the slots 0 through 9 represent waveforms given after the slide positions of the frames are adjusted through slide matching to provide for the smallest degree of similarity (i.e., the most similar state).

That is, suppose that in FIG. 12, the waveform indicated by, say, the slot 1 belongs to the second layer summary data file obtained from the moving image content of the sample data. Then that waveform is considered to be sufficiently similar to those of the second layer summary data file of the moving image contents corresponding to the slots 2 and 3. Consequently, the moving image content of the slot 1 is found to match the moving image contents of the slots 2 and 3. It is then determined that the moving contents targeted for search are those indicated by the waveform of the slots 2 and 3.

In step S166, the search result display image generation section 156 reads the moving image content file 111 of the same content data pair 102 as that of the second layer summary data file 112 whose degree of similarity is lower than a predetermined value. The moving image content file 111 thus retrieved is displayed on the display unit 27 together with the reproduction position as the result of search.

Where the above steps have been carried out, it is possible to search easily and quickly for a desired moving image content registered in the storage unit 24 by simply inputting the moving image content of the sample data.

Where hierarchical summary data such as the first and the second layer summary data are in use, a search refinement is first performed based on the first layer summary data indicative of feature quantities that are on a higher layer and have no chronological information, before a search for the target moving image content is carried out using the second layer summary data files that are on a lower layer and have chronological information. This makes it possible to reduce the load involved in search and boost the speed of search.

Furthermore, when the first layer summary data is managed in the form of a database, searches can be performed more easily and at higher speed than before. Since the first layer summary data is managed in units of classes after being clustered thereinto, the first layer summary data can be refined using the gravity center vector of each class. Only the first layer summary data thus refined may be compared with one another in detail. This permits implementation of a high-speed search process involving the first layer summary data alone.

[Compression Process]

The foregoing description focused on examples in which the target moving image content is searched for and retrieved easily and quickly by simply inputting the sample data composed of part of a moving image content. Sometimes, however, large quantities of individually different moving image contents each containing the same scene may well be retrieved and stored into the storage unit 24 as masses of moving image contents including the overlapping scenes. In such cases, each moving image content file may be compressed by deleting the overlapping scenes and by splicing only necessary scenes together, whereby the storage capacity of the storage unit 24 may be saved significantly.

Figure 13:
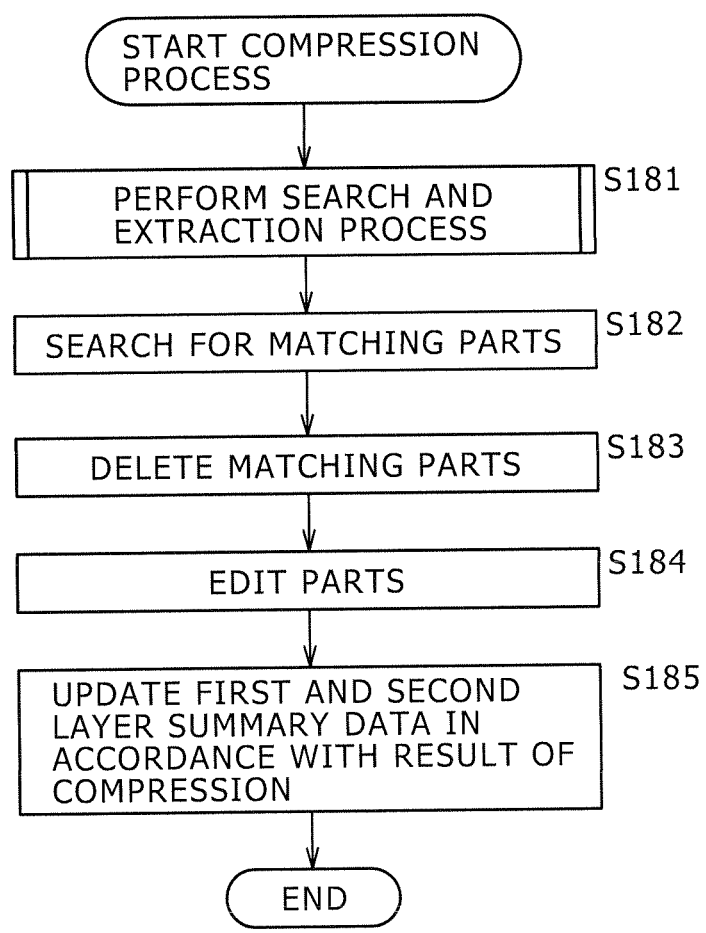
FIG. 13 is a flowchart explanatory of a compression process.

The above-mentioned compression process is explained below in reference to FIG. 13.

In step S181, the search and extraction unit 25 performs the search and extraction process to search for matched or similar moving image contents based on part of a given moving image content making up the sample data, thereby determining the corresponding contents along with the reproduction position. The search and extraction process is the same as the process discussed above in reference to the flowchart of FIG. 10 and thus will not be explained further.

In step S182, the content file compression unit 26 controls the matched part search section 211 to search a plurality of retrieved moving image content files for matched parts. That is, as explained above in reference to FIG. 11, the second layer summary data files 112 are compared through slide matching in units of a frame. The comparisons through search determine which of the frames from the moving image content of the sample data match those frames of the moving image contents that were considered matched or similar.

If a plurality of moving image contents have been retrieved as a result of the above comparisons, the matched part of the sample moving image content may be aligned with the retrieved moving image contents in order to recognize which frames correspond therebetween. Thus the matched part search section 211 aligns the matched frames between the moving image content files to search for identical parts. For example, the second layer summary data file 112 of a moving image content file Cont1 shown in the top row of FIG. 14 is aligned with the second layer summary data file 112 of a moving image content file Cont2 shown in the second row from the top, at the position of a frame F1. Of the shaded portions in FIG. 14, those filled with rising diagonal strokes indicating frames Fs1 through Fe1 represent the second layer summary data file 112 of the moving image content Cont1, and those with falling diagonal strokes indicating frames Fs2 through F2e denote the second layer summary data file 112 of the moving image content Cont2. The matched part search section 211 then determines through search that the portion ranging from the frame Fs1 to the frame Fe2 in the moving image content Cont1 (or Cont2) is identical between the two files.

In step S183, the content file compression unit 26 controls the mismatched part search section 212 to search the second layer summary data files 112 of the retrieved multiple moving image content files for mismatched parts. That is, in the case of FIG. 14, it is determined that the frames Fs2 through Fs1 of the moving image content Cont2 and the frames Fe2 through Fe1 of the moving image content Cont1 are mismatched parts.

In step S184, the content file compression unit 26 controls the edit section 213 to splice together the matched and mismatched parts through editing. That is, the edit section 213 splices together the frames Fs1 through Fe2 in the moving image content file 111 of the moving image content Cont1 (or Cont2) corresponding to the second layer summary data file 112, the frames Fs2 through Fs1 in the moving image content file 111 of the moving image content Cont2, and the frames Fe2 through Fe1 in the moving image content file 111 of the moving image content Cont1. In this case, if the moving image content Cont2 is taken as the reference, the frames Fe2 through Fe1 in the moving image content Cont1 need only be spliced together through editing as shown in the third row of FIG. 14. The splicing generates a grid-like portion constituting part of a new moving image content shown in the third row of FIG. 14. The rows indicated in FIG. 14 make up the structure of the second layer summary data file 112. The edit section 213 edits the moving image content file 111 based on that structure of the second layer summary data file 112.

In step S185, the update section 214 updates the first layer summary data database 101 and the content data pair 102 made of the moving image content file 111 and second layer summary data file 112 in a manner reflecting the newly generated moving image content. In this case, the update section 214 deletes the content data pair 102 of the moving image contents Cont1 and Cont 2 no longer necessary.

When the above steps have been carried out, the moving image content files can be compressed substantially. This makes it possible to save the storage capacity of the storage unit 24 accommodating the moving image contents. Also, the compression process reduces the number of the moving image contents targeted for search, so that the burden of content management is alleviated. At the same time, it is possible to reduce the load involved in searching for moving image contents based on sample data and thereby increase the speed of search.

The foregoing description dealt with examples in which the target image is divided into a plurality of partitioned regions so as to obtain the averages of the RGB pixel values in each of the partitioned regions for use as the first and the second layer summary data. However, this is not limitative of the present embodiment. The feature quantities need only be generated in units of a frame. For example, the averages of the RGB pixel values in each partitioned region may be replaced by averages of brightness or activity values in each partitioned region. The brightness histogram of each partitioned region may also be turned into data. For example, the resolution in the direction of brightness may be expressed in three to five bits. If expressed in four bits, the resolution in the direction of brightness is given as a 16-dimensional vector. Alternatively, the brightness values may be replaced by the RGB pixel values. Color solids expressed in RGB pixels may each be divided with a resolution of two to four bits along each of the axes involved, each of the divisions being supplemented with a frequency of its appearance. If expressed in three bits, each color solid division may be given as a 512-dimensional vector (=8$^3$). Furthermore, not only images but also audio information may be used as the basis for generating the first and the second layer summary data in units of a frame. For example, sound volumes or the averages of the amplitudes in each of predetermined audio frequency bands may be used in combination with image information.

Also, color clustering (a common image processing technique for attempting vector quantization on the distribution of the colors expressed three-dimensionally using RGB pixels) may be carried out on the pixels involved. The resulting RGB values may then be expressed using a three-dimensional vector with the most frequently used color indicated as the representative color.

Also, there may be cases where the screen is split into smaller regions so that one of the split regions is dedicated to frequent display of telop at its top or bottom field. In such cases, the screen region devoted to the frequent telop display may be divided with a coarser resolution than the other regions so as to alleviate the effects of telop.

In the foregoing description, the first layer summary data was shown acquired from the frame of interest which occurs at intervals of 30 frames or at the time of a scene change. Alternatively, the first layer summary data may be acquired at other intervals or nonperiodically in keeping with changes in the moving image content involved. For example, where the periodical solution is desired, the first layer summary data may be obtained at intervals of a different number of frames. Where the nonperiodical option is preferred, the first layer summary data may be acquired from the frame that occurs at the end of a silent part of audio data. Also in the foregoing description, the second layer summary data was shown obtained from every frame. However, the second layer summary data need only be acquired at intervals of a smaller number of frames than the first layer summary data. As long as this demand is met, the second layer summary data may be obtained periodically (e.g., at intervals of several frames) or nonperiodically whenever a certain condition (e.g., occurrence of a scene change) is satisfied.

The foregoing description gave examples in which, upon extraction of the first and the second layer summary data, the image is normalized by obtaining beforehand an activity image and by taking the position of high activity as the center position. Alternatively, the image may be normalized using a distance over which the auto-correlation function of the image is changed by a predetermined amount (e.g., 0.9 magnifications). The matched image may then be detected by tolerating a higher degree of freedom in scaling.

In determining whether a match occurs between vectors upon comparison, the distance therebetween is demanded to fall within a predetermined value. The predetermined value may be varied depending on the application. For example, if it is desired to search for a perfectly matched moving image content, the predetermined value should preferably be made small. Alternatively, the predetermined value may be allowed to be large if it is desired to search for matched images by disregarding, say, the presence of telop or of color collection.

In comparing the vectors each made of the first layer summary data in the above-described search and extraction process, it was determined whether a match exists between the vectors. Alternatively, as explained above in conjunction with the clustering process and initial clustering process, the distance between the vectors may be obtained so as to determine whether a sufficient similarity exists therebetween depending on whether the obtained distance is shorter than a predetermined distance. Conversely, the determination of whether the vectors match in the search and extraction process may replace the process of determining whether the distance obtained between the vectors reveals a sufficient similarity therebetween in the clustering process or initial clustering process.

Also, although the foregoing paragraphs explained examples involving a two-layer summary data structure formed by the first and the second layer summary data, this is not limitative of the present embodiment. Alternatively, a summary data structure of multiple layers may be adopted, with each layer subjected to the clustering process for classification purposes.

According to the present embodiment, as described above, it is possible easily to manage huge quantities of moving image contents as well as to search easily for a desired moving image content through such large amounts of moving image contents being managed.

The series of steps or processes described above may be executed either by hardware or by software. Where the software-based processing is to be carried out, the programs constituting the software may be either incorporated beforehand in the dedicated hardware of the computer to be used or installed upon use into a general-purpose personal computer or like equipment capable of executing diverse functions based on the installed programs.

FIG. 15 shows a typical structure of a general-purpose personal computer. The personal computer incorporates a CPU (central processing unit) 1001. An input/output interface 1005 is connected to the CPU 1001 via a bus 1004. A ROM (read only memory) 1002 and a RAM (random access memory) 1003 are also connected to the bus 1004.

The input/output interface 1005 is connected with an input section 1006, an output section 1007, a storage section 1008, and a communication section 1009. The input section 1006 is made up of input devices such as a keyboard and a mouse with which the user inputs operation commands. The output section 1007 allows process operation screens or process result images to appear on a display device. The storage section 1008 is generally formed by a hard disk drive for storing programs and various data. The communication section 1009 is typically composed of a LAN (local area network) adapter that performs communication processes over networks such as the Internet. Also, the input/output interface 1005 is connected with a drive 1010 that writes and reads data to and from a piece of removable media 1011 such as magnetic disks (including flexible disks), optical disks (including CD-ROM (Compact Disc-Read Only Memory) and DVD (Digital Versatile Disc)), magneto-optical disks (including MD (Mini Disc)), and semiconductor memories.

The CPU 1001 performs various processes in accordance with the programs stored in the ROM 1002 or in keeping with the programs that were read from the removable media 1011 such as the magnetic disk, optical disk, magneto-optical disk, or semiconductor memory and installed into the storage section 1008 before being loaded from there into the RAM 1003. The RAM 1003 may also accommodate data necessary for the CPU 1001 to perform its diverse processing.

In this specification, the steps describing the programs stored on the recording storage medium represent not only the processes that are to be carried out in the depicted sequence (i.e., on a time series basis) but also processes that may be performed parallelly or individually and not necessarily chronologically.

The present application contains subject matter related to that disclosed in Japanese Priority Patent Application JP 2010-090608 filed in the Japan Patent Office on Apr. 9, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
a central processing hardware unit including
first layer summary data generation means for, out of images extracted with a first frequency from the images making up a moving image content, generating first layer summary data of a first size before registering said first layer summary data to a database;
second layer summary data generation means for, out of images extracted with a second frequency higher than said first frequency from the images making up said moving image content, generating second layer summary data of a second size smaller than said first size;
first search means for, based on said first layer summary data generated by said first layer summary data generation means, searching said database for a corresponding moving image content;
second search means for, based on said second layer summary data generated by said second layer summary data generation means, searching the moving image contents retrieved by said first search means for a corresponding moving image content; and
compression means for connecting different regions between the moving image content retrieved by said second search means on the one hand and the moving image content from which said first layer summary data is generated by said first layer summary data generation means on the other hand, so as to delete either of the contents for moving image content data compression.

2. The image processing apparatus according to claim 1, wherein said first layer summary data is made up of one or a combination of a pixel value, a brightness value, an activity, an audio volume, and an average of amplitudes within a predetermined audio frequency band regarding each of a plurality of partitioned regions constituting each of the images which are part of said moving image contents and which are extracted therefrom with said first frequency, said first layer summary data having said first size; and
said second layer summary data is made up of at least one or a combination of a pixel value, a brightness value, an activity, an audio volume, and an average of amplitudes within a predetermined audio frequency band regarding each of a plurality of partitioned regions constituting each of the images which are part of said moving image contents and which are extracted therefrom with said second frequency higher than said first frequency, said second layer summary data having said second size.

3. The image processing apparatus according to claim 1, wherein said first and said second frequencies are those with which the images are extracted from said moving image contents either periodically or nonperiodically.

4. The image processing apparatus according to claim 3, wherein the periodical image extraction means extracting the images at intervals of a predetermined number of frames; and the nonperiodical image extraction means extracting the images every time a scene change occurs in said moving image content or every time a silent part of audio data is followed by a nonsilent part thereof.

5. An image processing method for use with an image processing apparatus including first layer summary data generation means for, out of images extracted with a first frequency from the images making up a moving image content, generating first layer summary data of a first size before registering said first layer summary data to a database; second layer summary data generation means for, out of images extracted with a second frequency higher than said first frequency from the images making up said moving image content, generating second layer summary data of a second size smaller than said first size; first search means for, based on said first layer summary data generated by said first layer summary data generation means, searching said database for a corresponding moving image content; and second search means for, based on said second layer summary data generated by said second layer summary data generation means, searching the moving image contents retrieved by said first search means for a corresponding moving image content; said image processing method comprising the steps of:

causing said first layer summary data generation means to generate, out of the images extracted with said first frequency from the images making up said moving image content, said first layer summary data of said first size before registering said first layer summary data to said database;

causing said second layer summary data generation means to generate, out of the images extracted with said second frequency higher than said first frequency from the images making up said moving image content, said second layer summary data of said second size smaller than said first size;

causing said first search means to search said database for the corresponding moving image content based on said first layer summary data generated by said first layer summary data generation step;

causing said second search means to search the moving image contents retrieved by said first search step for the corresponding moving image content based on said second layer summary data generated by said second layer summary data generation step; and connecting different regions between the moving image content retrieved by said second search means on the one hand and the moving image content from which said first layer summary data is generated by said first layer summary data generation means on the other hand, so as to delete either of the contents for moving image content data compression.

6. A program embodied on a non-transitory computer readable medium for use with a computer controlling an image processing apparatus including first layer summary data generation means for, out of images extracted with a first frequency from the images making up a moving image content, generating first layer summary data of a first size before registering said first layer summary data to a database; second layer summary data generation means for, out of images extracted with a second frequency higher than said first frequency from the images making up said moving image content, generating second layer summary data of a second size smaller than said first size; first search means for, based on said first layer summary data generated by said first layer summary data generation means, searching said database for a corresponding moving image content; and second search means for, based on said second layer summary data generated by said second layer summary data generation means, searching the moving image contents retrieved by said first search means for a corresponding moving image content; said program causing said computer to execute a procedure comprising the steps of:

causing said first layer summary data generation means to generate, out of the images extracted with said first frequency from the images making up said moving image content, said first layer summary data of said first size before registering said first layer summary data to said database;

causing said second layer summary data generation means to generate, out of the images extracted with said second frequency higher than said first frequency from the images making up said moving image content, said second layer summary data of said second size smaller than said first size;

causing said first search means to search said database for the corresponding moving image content based on said first layer summary data generated by said first layer summary data generation step;

causing said second search means to search the moving image contents retrieved by said first search step for the corresponding moving image content based on said second layer summary data generated by said second layer summary data generation step; and connecting different regions between the moving image content retrieved by said second search means on the one hand and the moving image content from which said first layer summary data is generated by said first layer summary data generation means on the other hand, so as to delete either of the contents for moving image content data compression.

7. An image processing apparatus comprising:

a central processing circuitry including a first layer summary data generation section configured to, out of images extracted with a first frequency from the images making up a moving image content, generate first layer summary data of a first size before registering said first layer summary data to a database;

a second layer summary data generation section configured to, out of images extracted with a second frequency higher than said first frequency from the images making up said moving image content, generate second layer summary data of a second size smaller than said first size;

a first search section configured to, based on said first layer summary data generated by said first layer summary data generation section, search said database for a corresponding moving image content;

a second search section configured to, based on said second layer summary data generated by said second layer summary data generation section, search the moving image contents retrieved by said first search section configured to a corresponding moving image content; and compression section configured to connect different regions between the moving image content retrieved by said second search section on the one hand and the moving image content from which said first layer summary data is generated by said first layer summary data generation section on the other hand, so as to delete either of the contents for moving image content data compression.

\* \* \* \* \*